(12) United States Patent
Abedini et al.

(10) Patent No.: US 10,736,166 B2
(45) Date of Patent: Aug. 4, 2020

(54) ASSISTED NODE-TO-NODE COMMUNICATION LINK OPERATIONS IN A WIRELESS NETWORK

(71) Applicant: QUALCOMM Incorporated, San Diego, CA (US)

(72) Inventors: Navid Abedini, Somerset, NJ (US); Junyi Li, Chester, NJ (US); Karl Georg Hampel, Hoboken, NJ (US); Sundar Subramanian, San Diego, CA (US); Muhammad Nazmul Islam, Edison, NJ (US); Jianghong Luo, Skillman, NJ (US); Juergen Cezanne, Ocean Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/036,026

(22) Filed: Jul. 16, 2018

(65) Prior Publication Data

US 2019/0045569 A1 Feb. 7, 2019

Related U.S. Application Data

(60) Provisional application No. 62/541,487, filed on Aug. 4, 2017.

(51) Int. Cl.
*H04L 12/26* (2006.01)
*H04W 76/18* (2018.01)
(Continued)

(52) U.S. Cl.
CPC ........... *H04W 76/18* (2018.02); *H04W 24/10* (2013.01); *H04W 72/042* (2013.01);
(Continued)

(58) Field of Classification Search
CPC . H04W 24/10; H04W 72/042; H04W 72/046; H04W 72/0473; H04W 72/12; H04W 76/14; H04W 76/15; H04W 76/18
See application file for complete search history.

(56) References Cited

U.S. PATENT DOCUMENTS 9,596,691 B2   3/2017 Ozluturk et al.
2003/0161261 A1   8/2003 Weis
(Continued)

FOREIGN PATENT DOCUMENTS

KR    20170085428 A   7/2017
WO    WO-2016172360 A1  10/2016

OTHER PUBLICATIONS

Habiba U., et al., "Backhauling 5G Small Cells with Massive-MIMO-Enabled mmWave Communication", In: "Backhauling/Fronthauling for Future Wireless Systems", Dec. 1, 2016, John Wiley & Sons, Incorporated, XP055505270, ISBN: 978-1-119-17034-1, pp. 29-53.

(Continued)

*Primary Examiner* — Minh Trang T Nguyen
(74) *Attorney, Agent, or Firm* — Linda G. Gunderson; Holland & Hart LLP

(57) ABSTRACT

Methods, systems, and devices for wireless communication are described that provide for establishment of communication links between nodes in a wireless network, in which an access node (e.g., a node that provides access to a core network) may provide a communication link configuration and resources for communications between multiple nodes. In some cases, an access node may receive a request from a first node to establish a communication link with a second node. The communication link may be, for example, a directional transmission beam that carries data or control information, or a combination thereof, between the first node and the second node. The access node may determine the (Continued)

communication link configuration based on one or more link measurements provided by the first node or second node, and provide the configuration information to one or both of the first node or the second node.

30 Claims, 15 Drawing Sheets

(51) Int. Cl.
*H04W 72/04* (2009.01)
*H04W 76/14* (2018.01)
*H04W 76/15* (2018.01)
*H04W 24/10* (2009.01)
*H04W 72/12* (2009.01)

(52) U.S. Cl.
CPC ....... *H04W 72/0473* (2013.01); *H04W 72/12* (2013.01); *H04W 76/14* (2018.02); *H04W 76/15* (2018.02); *H04W 72/046* (2013.01)

(56) References Cited

U.S. PATENT DOCUMENTS

| | | | | |
|---|---|---|---|---|
| 2011/0316744 A1* | 12/2011 | Morioka | ............ | H04W 72/046 342/367 |
| 2014/0133388 A1 | 5/2014 | Wager et al. | | |
| 2014/0153390 A1 | 6/2014 | Ishii et al. | | |
| 2014/0266896 A1 | 9/2014 | Hyslop et al. | | |
| 2014/0314049 A1 | 10/2014 | Cho et al. | | |
| 2014/0328329 A1 | 11/2014 | Novlan et al. | | |
| 2015/0282142 A1* | 10/2015 | Dahlman | .............. | H04W 84/20 370/329 |
| 2016/0205664 A1* | 7/2016 | Zhang | ................... | H04L 5/001 370/312 |
| 2016/0269097 A1 | 9/2016 | Islam et al. | | |

OTHER PUBLICATIONS

International Search Report and Written Opinion—PCT/US2018/042704—ISA/EPO—Sep. 21, 2018 (175689WO).

Samsung: "Interference Measurement Table and Beam Coordination", 3GPP Draft; R1-1710760, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; Jun. 27, 2017-Jun. 30, 2017 Jun. 26, 2017, XP051299965, Retrieved from the Internet: URL:http://www.3gpp.org/ftp/Meetings_3GPP_SYNC/RAN1/Docs/ [retrieved on Jun. 26, 2017], 7 pages.

Lianghai J., et al., "Applying Device-to-Device Communication to Enhance IoT Services", IEEE Communications Standards Magazine, 2017, vol. 1, No. 2, pp. 1-14.

\* cited by examiner

ASSISTED NODE-TO-NODE COMMUNICATION LINK OPERATIONS IN A WIRELESS NETWORK

CROSS REFERENCES

The present Application for Patent claims priority to U.S. Provisional Patent Application No. 62/541,487 by Abedini et al., entitled "Assisted Node-to-Node Communication Link Operations in a Wireless Network," filed Aug. 4, 2017, assigned to the assignee hereof, the entirety of which is hereby expressly incorporated by reference.

BACKGROUND

The following relates generally to wireless communication, and more specifically to assisted node-to-node communication link operations in a wireless network.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A base station may employ a wireline link to communicate with neighboring base stations to coordinate backhaul transmissions. Some wireless communications systems (e.g., millimeter wave (mmW) communications systems) may deploy a large number of densely-spaced base stations. In such systems, the base stations may use wireless backhaul links (e.g., relay nodes) for backhaul communications in addition to or instead of wireline links. Further, in some cases it may be desirable for two or more nodes (e.g., base stations or UEs) in a wireless communications system to establish node-to-node communications.

SUMMARY

The described techniques relate to improved methods, systems, devices, or apparatuses that support assisted node-to-node communication link operations in a wireless network. Generally, the described techniques provide for establishment of communication links between nodes in a wireless network, where an access node (e.g., a node that provides access to a core network) may provide a communication link configuration and resources for communications between two or more other nodes. In some cases, an access node may receive a request from a first node to establish a communication link with a second node. The communication link may be, for example, a directional transmission beam that carries data or control information, or a combination thereof, between the first node and the second node. The access node may determine the communication link configuration based on one or more link measurements provided by the first node or second node, and provide the configuration information to one or both of the first node or the second node.

A method of wireless communication is described. The method may include receiving, at an access node, a request from a first node to establish a communication link with a second node, where the communication link is a directional communication link for transmission of one or more of control information or data between the first node and the second node, determining, at the access node, a configuration for the communication link between the first node and the second node, and transmitting, to at least one of the first node or the second node, the configuration for the communication link.

An apparatus for wireless communication is described. The apparatus may include means for receiving, at an access node, a request from a first node to establish a communication link with a second node, where the communication link is a directional communication link for transmission of one or more of control information or data between the first node and the second node, means for determining, at the access node, a configuration for the communication link between the first node and the second node, and means for transmitting, to at least one of the first node or the second node, the configuration for the communication link.

Another apparatus for wireless communication is described. The apparatus may include a processor, memory in electronic communication with the processor, and instructions stored in the memory. The instructions may be operable to cause the processor to receive, at an access node, a request from a first node to establish a communication link with a second node, where the communication link is a directional communication link for transmission of one or more of control information or data between the first node and the second node, determine, at the access node, a configuration for the communication link between the first node and the second node, and transmit, to at least one of the first node or the second node, the configuration for the communication link.

A non-transitory computer readable medium for wireless communication is described. The non-transitory computer-readable medium may include instructions operable to cause a processor to receive, at an access node, a request from a first node to establish a communication link with a second node, where the communication link is a directional communication link for transmission of one or more of control information or data between the first node and the second node, determine, at the access node, a configuration for the communication link between the first node and the second node, and transmit, to at least one of the first node or the second node, the configuration for the communication link.

In some examples of the method, apparatus, and non-transitory computer-readable medium described above, the determining includes determining one or more directional transmission beam characteristics for a directional transmission beam between the first node and the second node, and the configuration may be based on the one or more directional transmission beam characteristics. In some examples of the method, apparatus, and non-transitory computer-readable medium described above, the one or more directional transmission beam characteristics include one or more of time or frequency resources for the communication link, one or more transmit or receive beams for the communication link, a modulation and coding scheme (MCS) for the communication link, a number of antenna ports for the communication link, a number of layers for the communication link, a numerology for the communication link, a transmission power for the communication link, or any combination thereof.

Some examples of the method, apparatus, and non-transitory computer-readable medium described above may further include processes, features, means, or instructions for determining a communication link management procedure configuration. Some examples of the method, apparatus, and non-transitory computer-readable medium described above may further include processes, features, means, or instructions for transmitting the communication link management procedure configuration to one or more of the first node or the second node. Some examples of the method, apparatus, and non-transitory computer-readable medium described above may further include processes, features, means, or instructions for receiving, from one or more of the first node or the second node, one or more measurement characteristics from a communication link management procedure, where determining the configuration for the communication link may be based on the one or more measurement characteristics.

Some examples of the method, apparatus, and non-transitory computer-readable medium described above may further include processes, features, means, or instructions for receiving, from one or more of the first node or the second node subsequent to communications using the communication link, a report associated with the communication link. In some examples of the method, apparatus, and non-transitory computer-readable medium described above, the report includes one or more of an indication that communication between the first node and the second node may be complete, a request for additional communication link resources, or a measurement report with one or more measurement characteristics of the communication link.

In some examples of the method, apparatus, and non-transitory computer-readable medium described above, the request to establish the communication link includes one or more of communication link measurement information for a potential communication link between the first node and the second node, or candidate resources of configurations for the potential communication link between the first node and the second node. In some examples of the method, apparatus, and non-transitory computer-readable medium described above, the communication link measurement information or the candidate resources or configurations may be based on a prior communication link between the first node and the second node.

Some examples of the method, apparatus, and non-transitory computer-readable medium described above may further include processes, features, means, or instructions for configuring, prior to receiving the request to establish the communication link, one or more of the first node or the second node to perform a communication link management procedure prior to transmitting the request to establish the communication link. In some examples of the method, apparatus, and non-transitory computer-readable medium described above, the access node provides one or more of a schedule or a set of pre-allocated resources to one or more of the first node or the second node for performing the communication link management procedure.

In some examples of the method, apparatus, and non-transitory computer-readable medium described above, the configuration for the communication link includes one or more of a transmission/measurement time window, periodicity, transmission bandwidth, a set of transmit and receive directional beams to be measured at the first node and the second node, a reference signal configuration including one or more of a reference signal sequence or a number of antenna ports for reference signal transmission, quasi-colocation (QCL) information between different antenna ports of the first node or the second node, a numerology for the communication link, or a transmission power for the communication link.

In some examples of the method, apparatus, and non-transitory computer-readable medium described above, the configuration may be for a sidelink communication between the first node and the second node and includes one or more of time or frequency resources for transmitting one or more of control of data between the first node and the second node, an identification of transmit and receive beams for the sidelink communication, an MCS for the sidelink communication, a number of antenna ports for the sidelink communication, a number of layers for the sidelink communication, a numerology for the sidelink communication, or a transmission power for the sidelink communication.

In some examples of the method, apparatus, and non-transitory computer-readable medium described above, the determining may be based on one or more of one or more measurement reports from the first node, the second node, or one or more neighboring nodes, capabilities of the first node or the second node, traffic present at one or more of the first node, the second node, or one or more other nodes, a preferred set of resources of the first node or the second node, or a state or schedule of the one or more neighboring nodes to the first node or the second node.

In some examples of the method, apparatus, and non-transitory computer-readable medium described above, the communication link management procedure configuration may include one or more of a configuration for transmitting and receiving reference signals using a set of directional transmission beams, a configuration for transmitting and receiving one or more of synchronization signals, paging signals, or a random access preamble using the set of directional transmission beams, or a resource and beam configuration correspondence between different reference signals and synchronization signals. In some examples of the method, apparatus, and non-transitory computer-readable medium described above, the configuration also includes a communication link failure recovery mechanism and resources for reporting a communication link failure to the access node or the other of the first node or the second node.

A method of wireless communication is described. The method may include identifying, at a first node, a second node for establishing a communication link for directional transmission of one or more of control information or data, transmitting, from the first node, a request to an access node to establish the communication link with a second node, receiving, from the access node, a configuration for the communication link between the first node and the second node, and establishing, at the first node, the communication link with the second node based on the configuration for the communication link.

An apparatus for wireless communication is described. The apparatus may include means for identifying, at a first node, a second node for establishing a communication link for directional transmission of one or more of control information or data, means for transmitting, from the first node, a request to an access node to establish the communication link with a second node, means for receiving, from the access node, a configuration for the communication link between the first node and the second node, and means for establishing, at the first node, the communication link with the second node based on the configuration for the communication link.

Another apparatus for wireless communication is described. The apparatus may include a processor, memory in electronic communication with the processor, and instructions stored in the memory. The instructions may be operable to cause the processor to identify, at a first node, a second node for establishing a communication link for directional transmission of one or more of control information or data, transmit, from the first node, a request to an access node to establish the communication link with a second node, receive, from the access node, a configuration for the communication link between the first node and the second node, and establish, at the first node, the communication link with the second node based on the configuration for the communication link.

A non-transitory computer readable medium for wireless communication is described. The non-transitory computer-readable medium may include instructions operable to cause a processor to identify, at a first node, a second node for establishing a communication link for directional transmission of one or more of control information or data, transmit, from the first node, a request to an access node to establish the communication link with a second node, receive, from the access node, a configuration for the communication link between the first node and the second node, and establish, at the first node, the communication link with the second node based on the configuration for the communication link.

In some examples of the method, apparatus, and non-transitory computer-readable medium described above, the communication link may be a directional transmission beam, and the receiving includes receiving one or more directional transmission beam characteristics for the directional transmission beam between the first node and the second node. In some examples of the method, apparatus, and non-transitory computer-readable medium described above, the one or more directional transmission beam characteristics include one or more of time or frequency resources for the communication link, one or more transmit or receive beams for the communication link, an MCS for the communication link, a number of antenna ports for the communication link, a number of layers for the communication link, a numerology for the communication link, a transmission power for the communication link, or any combination thereof.

In some examples of the method, apparatus, and non-transitory computer-readable medium described above, the receiving further includes receiving, from the access node, a communication link management procedure configuration, and performing a communication link management procedure based on the communication link management procedure configuration, and the configuration for the communication link may be based on one or more measurements made during the communication link management procedure. Some examples of the method, apparatus, and non-transitory computer-readable medium described above may further include processes, features, means, or instructions for transmitting one or more measurements from the communication link management procedure to the access node prior to receiving the configuration for the communication link.

Some examples of the method, apparatus, and non-transitory computer-readable medium described above may further include processes, features, means, or instructions for transmitting, to the access node, subsequent to communications using the communication link, a report associated with the communication link. In some examples of the method, apparatus, and non-transitory computer-readable medium described above, the report includes one or more of an indication that communication between the first node and the second node may be complete, a request for additional communication link resources, or a measurement report with one or more measurement characteristics of the communication link. In some examples of the method, apparatus, and non-transitory computer-readable medium described above, the request to establish the communication link includes one or more of communication link measurement information for a potential communication link between the first node and the second node, or candidate resources for the potential communication link between the first node and the second node. In some examples of the method, apparatus, and non-transitory computer-readable medium described above, the communication link measurement information or the candidate resources may be based on a prior communication link between the first node and the second node.

Some examples of the method, apparatus, and non-transitory computer-readable medium described above may further include processes, features, means, or instructions for receiving, at the first node, a configuration from the access node to perform a communication link management procedure prior to transmitting the request to establish the communication link. In some examples of the method, apparatus, and non-transitory computer-readable medium described above, the access node provides one or more of a schedule or a set of pre-allocated resources for performing the communication link management procedure.

DETAILED DESCRIPTION

Figure 1:
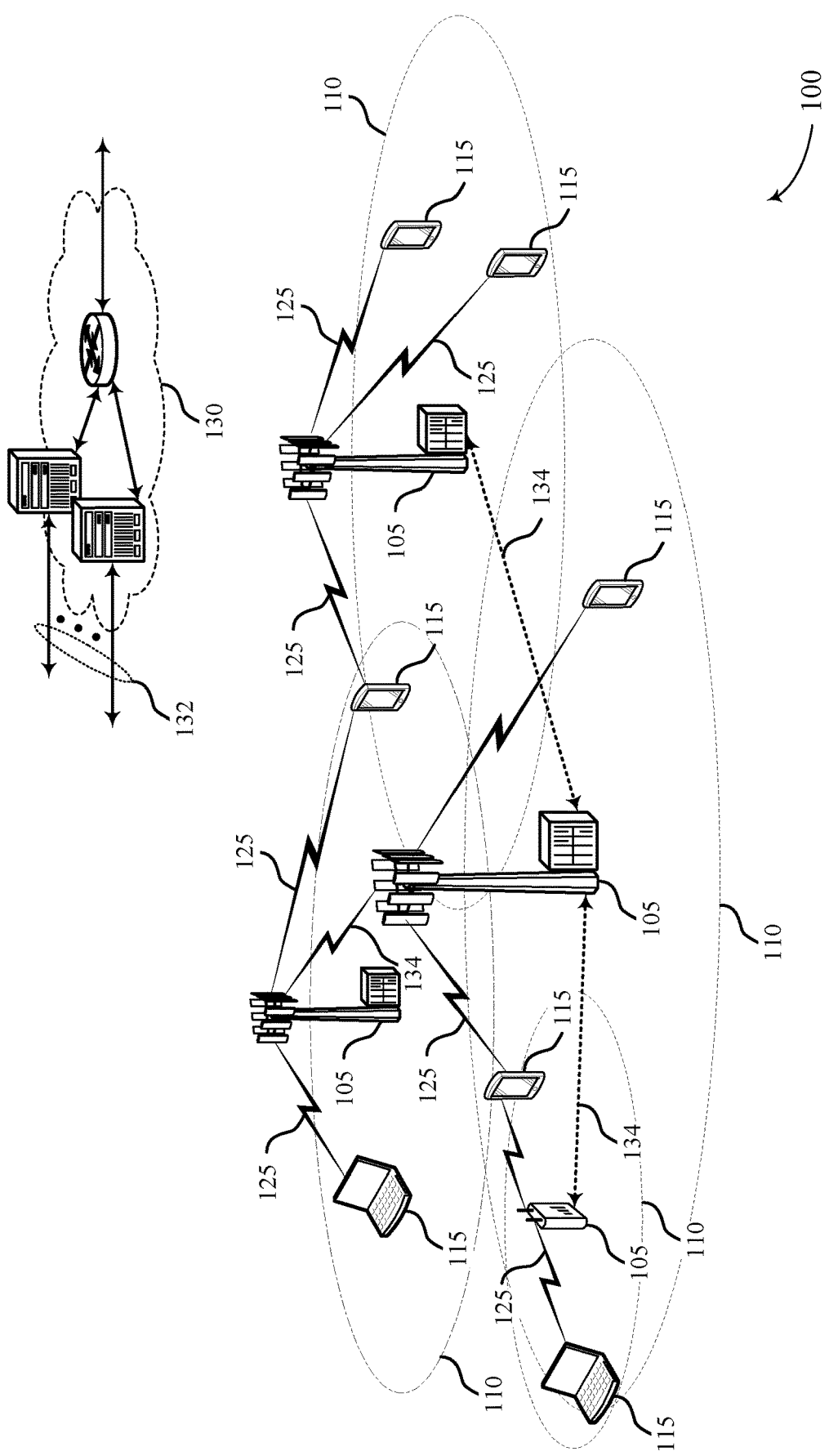
FIG. 1 illustrates an example of a wireless communications system in accordance with aspects of the present disclosure.

Wireless communications systems may use various different techniques for communications, and some systems (e.g., fifth generation (5G) or New Radio (NR) systems) may use directional communications (e.g., millimeter wave (mmW) transmissions) between wireless nodes (e.g., a base station or a user equipment (UE)). Directional transmissions may be used to support, for example, access traffic between an access node and a UE, or backhaul traffic between different access nodes. Some systems, such as relatively dense deployments of mmW base stations, may provide a subset of the access nodes with a wireline connection. In these systems, other access nodes may have a wireless backhaul connection with one or more of the subset of the access nodes with the wireline connection, which may be referred to as self-backhauling or integrated access/backhaul (IAB). Self-backhauling or IAB may share wireless resources between access traffic and backhaul traffic and may have benefits of enhancing wireless link capacity, reducing latency, reducing the cost of cell deployment, or any combination thereof. In systems with mmW base station deployments, IAB may use relatively narrow beams, which may be referred to as pencil beams, for wireless backhaul links between base stations. In these systems, the relatively narrow beams may help reduce inter-link interference with one or more other directional communication links in the system.

Various wireless communications systems as described herein may use direct node-to-node communications that may be configured by an access node, in which two nodes may establish a communication link for transfer of data, control information, or any combination thereof, directly without involvement of the access node. Node-to-node communication may be used to provide various different types of communication, and may sometimes be referred to as sidelink communication. When establishing a node-to-node communication link, an access node (e.g., a base station or a master UE), may coordinate communication between two other UEs. In some cases, an access node may coordinate backhaul communication between two other nodes, which may be any combination of base stations and UEs. In some instances, an access node coordinating node-to-node communications of two other nodes may not necessarily be directly connected to one or more of the other nodes, and instead the connection may be a logical connection through multiple hops. Further, in some examples, an access node coordinating a node-to-node communication link between two other nodes may use a different radio access technology (RAT) than a RAT used for the node-to-node communication link.

Various aspects of the present disclosure provide techniques for coordination by an access node for the establishment and communications over a communication link between two other nodes. In some cases, an access node may receive a request from a first node to establish a communication link with a second node. The communication link may be, for example, a directional transmission that may carry data or control information, or a combination thereof, between the first node and the second node. The access node may determine the communication link configuration based on one or more link measurements provided by the first node or second node. The access node may further provide the configuration information to one or both of the first node and the second node.

Aspects of the disclosure are initially described in the context of a wireless communications system. Further examples are then provided that illustrate node-to-node communication links and process flows implementing such communication links. Aspects of the disclosure are further illustrated by and described with reference to apparatus diagrams, system diagrams, and flowcharts that relate to assisted node-to-node communication link operations in a wireless network.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices. One or more of the UEs 115 or base stations 105 may serve as an access node that may provide configuration information for a communication link between other nodes, which may be any combination of UEs 115 and base stations 105.

Base stations 105 may wirelessly communicate with UEs 115 or one or more other base stations 105 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105. In some cases, D2D communications may be referred to as sidelink communications.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130). Backhaul links 134 may be wireline links or wireless links, as will be discussed in more detail below.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 kilometers (km)) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 25 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. The propagation of EHF transmissions may be subject to even greater atmospheric attenuation and shorter range than SHF or UHF transmissions, which may lead to relatively dense deployments in systems that use mmW. Techniques disclosed herein may be employed across transmissions that use one or more different frequency regions, and designated use of bands across these frequency regions may differ by country or regulating body.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115 or another base station 105. For instance, some signals (e.g. synchronization signals, reference signals, beam selection signals, paging signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device). In cases where two UEs 115 or two base stations 105 may establish a direct directional communication link, similar techniques may be used to identify a beam direction for the directional communication link, and such a process may be coordinated by an access node as discussed herein.

A receiving device (e.g., a UE 115 or a base station 105, which may be an example of a mmW receiving device) may try multiple receive beams when receiving various signals, such as synchronization signals, reference signals, beam selection signals, paging signals, or other control signals. For example, a receiving device may try multiple receive directions by: receiving via different antenna subarrays, processing received signals according to different antenna subarrays, receiving according to different receive beamforming weight sets applied to signals received at a plurality of antenna elements of an antenna array, or processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications systems, such as an NR system, may utilize any combination of licensed, shared, and unlicensed spectrum bands, among others. In some cases, flexible symbol durations and subcarrier spacing may allow for the use of carriers across multiple spectrums. In some examples, NR shared spectrum may increase spectrum utilization and spectral efficiency, specifically through dynamic vertical (e.g., across frequency) and horizontal (e.g., across time) sharing of resources.

Figure 2:
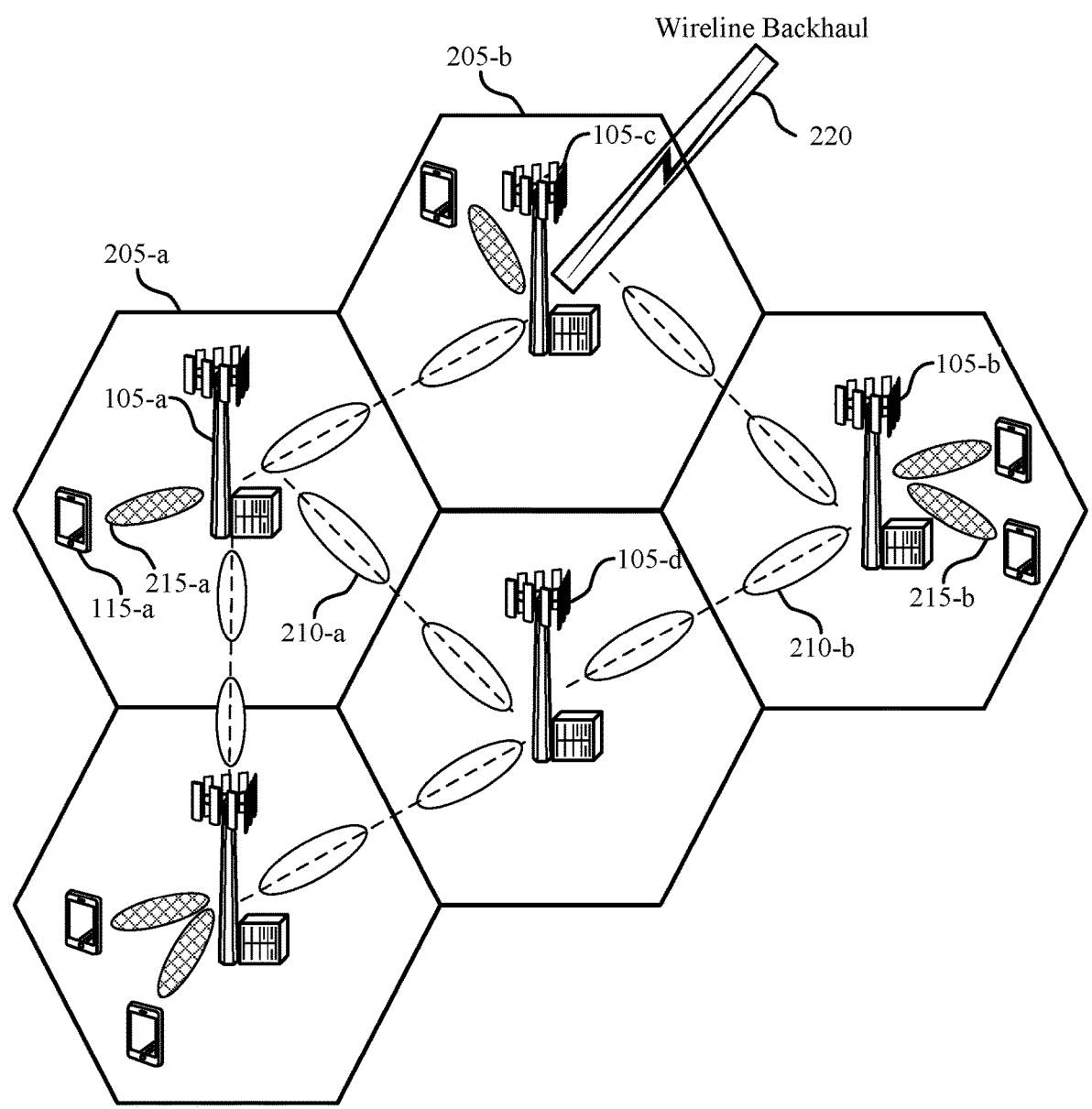
FIG. 2 illustrates an example of a wireless communications system and access nodes in accordance with aspects of the present disclosure.

FIG. 2 illustrates an example of a wireless communications system 200 and access nodes in accordance with various aspects of the present disclosure. In some examples, wireless communications system 200 may implement aspects of wireless communications system 100. Wireless communications system 200 may include a number of mesh networks 205 that may communicate with each other over wireless links 210 via base stations 105. That is, wireless communications system 200 may include wireline backhaul link 220, in addition to several relay nodes (e.g., base stations 105) such that mesh networks 205 may be connected via wireless links 210. Wireless links 210 (e.g., wireless backhaul links, fronthaul links, access links, etc.) may be associated with a same or different set of wireless resources (e.g., time resources, frequency resources, code resources, spatial resources, beams, etc.). Base stations 105 may further communicate with UEs 115 via direct wireless links 215. Wireless communications system 200 may support the coordination of direct communication links between different nodes (e.g., UEs 115, base stations 105, or any combination thereof) in wireless communications system 200, and an access node may configure such direct communication links.

In the example of FIG. 2, base stations 105 may be access nodes, and one access node, base station 105-c in this example, is supported with a wireline backhaul, such as a high capacity fiber backhaul connection to a core network. Other base stations 105 may be connected to base station 105-c with a backhaul wireless link 210. In some cases, wireless links 215 may be pencil beam directional communication links that use mmW directional transmissions. In some cases, base station 105-c may configure backhaul wireless links 210 between other base stations 105. For example, base station 105-c may configure a backhaul wireless link 210-a between base station 105-a and base station 105-d. In some cases, base station 105-c, which may act as an access node relative to the other base stations 105, and may configure wireless links 215 by initiating a communication link management procedure that may be used to identify a suitable pair of transmit and receive beams that can support communication over a wireless link 215. In some cases, base station 105-c may configure one or more other base stations 105, such as base station 105-a and base station 105-d, with a communication link management procedure, which may provide beam sweeping information (e.g., a transmitter may page a receiver and transmit a set of reference signals, such as synchronization or beam reference signals, in a number of directions via multiple paging signals, and a receiver may test different receive beams to receive the transmitted signals), beam measurements, beam reporting, beam determination, or any combination thereof.

The communication link management procedure, in some cases, may also include beam failure and recovery procedures. Beam failure may happen when the quality of a beam pair drops below a threshold at least for some minimum amount of time. In some cases, a recovery mechanism may be configured that provides a feedback mechanism to inform the transmitter of a failure. In some cases, beam recovery may be initiated by performing beam sweeping and measurements. In cases where beam failure is for access traffic a UE 115 may send a message in a set of preconfigured resources to inform the base station 105. In cases where beam failure for backhaul traffic, for example, between base station 105-a and base station 105-d, base station 105-a may detect the failure and send a message to base station 105-d either directly or through base station 105-c (e.g., through a multi-hop link from base station 105-c and base station 105-b). While the example of FIG. 2 shows base station 105-c acting as an access node, other wireless devices may act as an access node, such as a UE 115 or other wireless device. For example, FIG. 3 illustrates generic nodes that may implement techniques as discussed herein.

Figure 3:
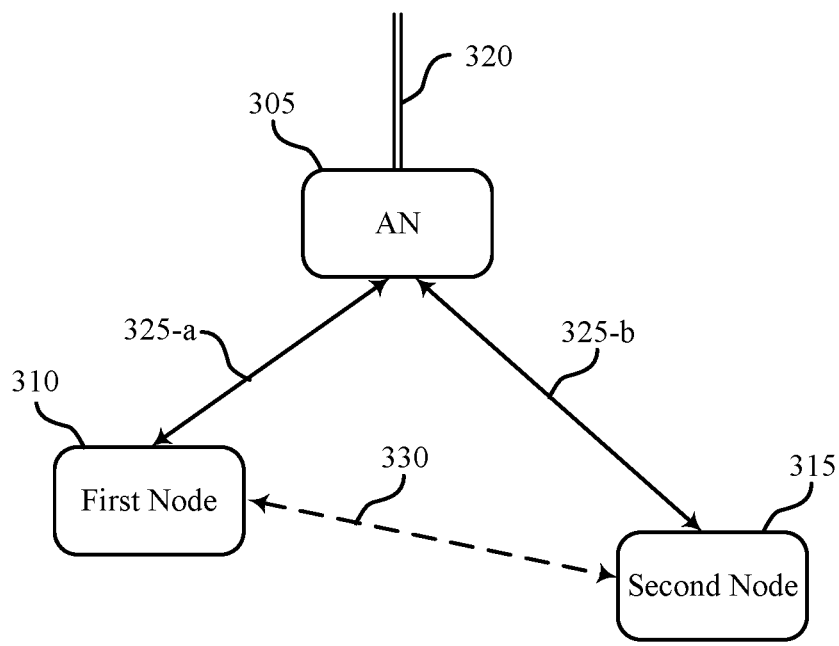
FIG. 3 illustrates an example of a portion of a wireless communications system in accordance with aspects of the present disclosure.

FIG. 3 illustrates an example of a portion of a wireless communications system 300 in accordance with various aspects of the present disclosure. In some examples, wireless communications system 300 may implement aspects of wireless communications system 100 or 200.

In the example of FIG. 3, an access node 305, which may be an example of a base station 105 or UE 115 as described with reference to FIGS. 1 and 2, may support one or more wireless links 325 between multiple other access nodes. In this example, a first node 310 (e.g., a base station 105 or UE 115) may communicate with access node 305 over wireless link 325-a, and a second node 315 (e.g., a base station 105 or a UE 115) may communicate with access node 305 over wireless link 325-b. Access node 305 may have an access connection 320 to a core network, which may be an example of a fiber backhaul connection. In some cases, access node 305 may configure a node-to-node connection 330 between first node 310 and second node 315. Such a configuration may be performed according to techniques, such as discussed with reference to the examples of FIGS. 4-6.

Figure 4:
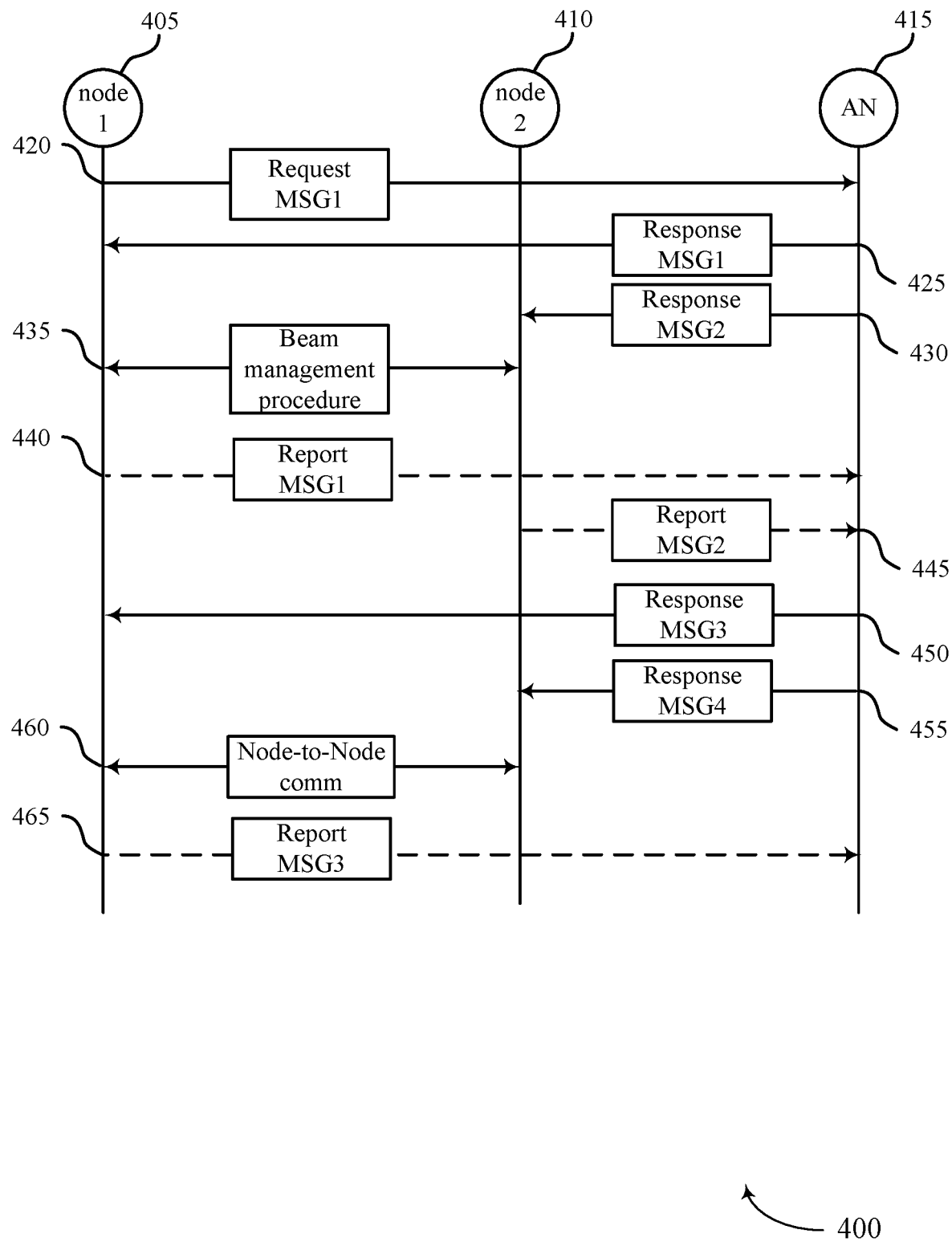
FIG. 4-6 illustrate examples of process flows in accordance with aspects of the present disclosure.

FIG. 4 illustrates an example of a process flow 400 in accordance with various aspects of the present disclosure. In some examples, process flow 400 may implement aspects of wireless communications system 100, 200, or 300. Process flow 400 may include a first node 405, a second node 410, and an access node 415. First node 405, second node 410, and access node 415 each may be a base station 105 or a UE 115, such as described with reference to FIGS. 1-2.

In this example, first node 405 may transmit a request message 420 to access node 415. Request message 420 may be a request for a node-to-node communication link between first node 405 and second node 410. Request message 420 may request, for example, a sidelink operation with second node 410. In other examples, request message 420 may be a request for a backhaul link with second node 410. The communication link may, in some examples, refer to a link for transmitting a single communication block (including data channel(s) and possibly control channel(s)) from a transmitting node to a receiving node, and possibly receiving one or more control channels (e.g., that provide feedback such as acknowledgment feedback (ACK/NACK) indicating successful or unsuccessful reception of a transmission). In some cases, the communication link may be used for a communication session that includes a sequence of communication blocks that are transmitted/received between first node 405 and second node 410. In such cases, some aspects of beam management may be performed along with the communication.

Access node 415 may receive request message 420, and transmit a first response message 425 to first node 405 and a second response message 430 to second node 410. In some cases, each of the first response message 425 and second response message 430 may provide a communication link management procedure configuration (or a beam management configuration).

First node 405 and second node 410 may receive the respective response messages 425-430, and perform a beam management procedure 435. As discussed above, beam management procedure 435 may provide information that may be used to establish a directional communication link. In some cases, beam management procedure 435 may include sending/receiving beam reference signals using a set of transmit/receive beams, which may be used for the purpose of, for example, beam training and channel state acquisition. Additionally or alternatively, beam management procedure 435 may include sending/receiving synchronization signals, paging signals, or a random access channel (RACH) preamble using a set of transmit/receive beams, which may be used for time/frequency synchronization and exchanging some system information, and which also may be used for beam training. In cases where both reference signals and synchronization/RACH signals are transmitted, there may be a resource and beam configuration correspondence between different signals. In some cases, the resource and beam configuration information may include one or more of: a transmission/measurement time window (offset and window length), periodicity, and transmit bandwidth; a set of transmit/receive beams to measure; a reference signal configuration (e.g., reference sequences, number of ports, etc.); quasi colocation (QCL) information between different antenna ports; numerology information; transmission power information; or any combination thereof.

Further, in some cases, the beam management configuration may include a beam failure recovery mechanism. For example, as part of the beam management configuration, access node 415 may configure some resources one or both of first node 405 or second node 410 to report a beam failure. Such a report may be transmitted directly to the other node or transmitted to access node 415. If a failure report is sent to access node 415, access node 415 may respond by informing the other node to participate in a beam recovery procedure, and also may provide configuration/resources for the beam recovery procedure.

Following the performance of beam management procedure 435 (e.g., within the allocated resources and with the given beam management configuration or communication link management procedure configuration), first node 405 and second node 410 may generate a report. For instance, first node 405 may transmit a first report message 440 to access node 415, and second node 410 may transmit a second report message 445 to access node 415. The report messages 440-445 may include, for example, beam measurement information that access node 415 may use to configure a node-to-node communication link between first node 405 and second node 410.

Access node 415 may determine the configuration for the node-to-node communication (e.g., sidelink communication) based on the report messages 440-445, and transmit a third response message 450 to first node 405 and a fourth response message 455 to second node 410. In some cases, access node 415 may transmit a response message to only one of the nodes, which may then communicate any necessary configuration information to the other node. The response messages 450-455 may include a configuration for a directional communication link, a selected transmission beam, and allocated resources for the node-to-node communications. In some cases, the link configuration may include: time and/or frequency and/or power resources to use for control (including ACK) and data transmissions; transmit/receive beams; a modulation and coding scheme (MCS); a number of ports; a number of layers; numerology (e.g., sub-carrier spacing and cyclic prefix length); a demodulation reference signal (DMRS) configuration, or any combination thereof. In some cases, access node 415 may determine the configuration based on one or more of beam measurement reports from the nodes; node capabilities (e.g., beam correspondence, space division multiplexing (SDM) capability, radio frequency (RF) and digital processing capabilities) of each node; traffic demand; one or more other indications from a node (e.g. preferred set of resources or configurations); a state/schedule of other nodes in the system; or any combination thereof.

First node 405 and second node 410 may use this configuration information for node-to-node communications 460. In some cases, one or both of first node 405 and second node 410 may transmit a third report message 465 to access node 415, which may indicate that the node-to-node communication operation is over (freeing up resources), request for more resources, provide beam or channel measurement reports, or any combination thereof.

Figure 5:
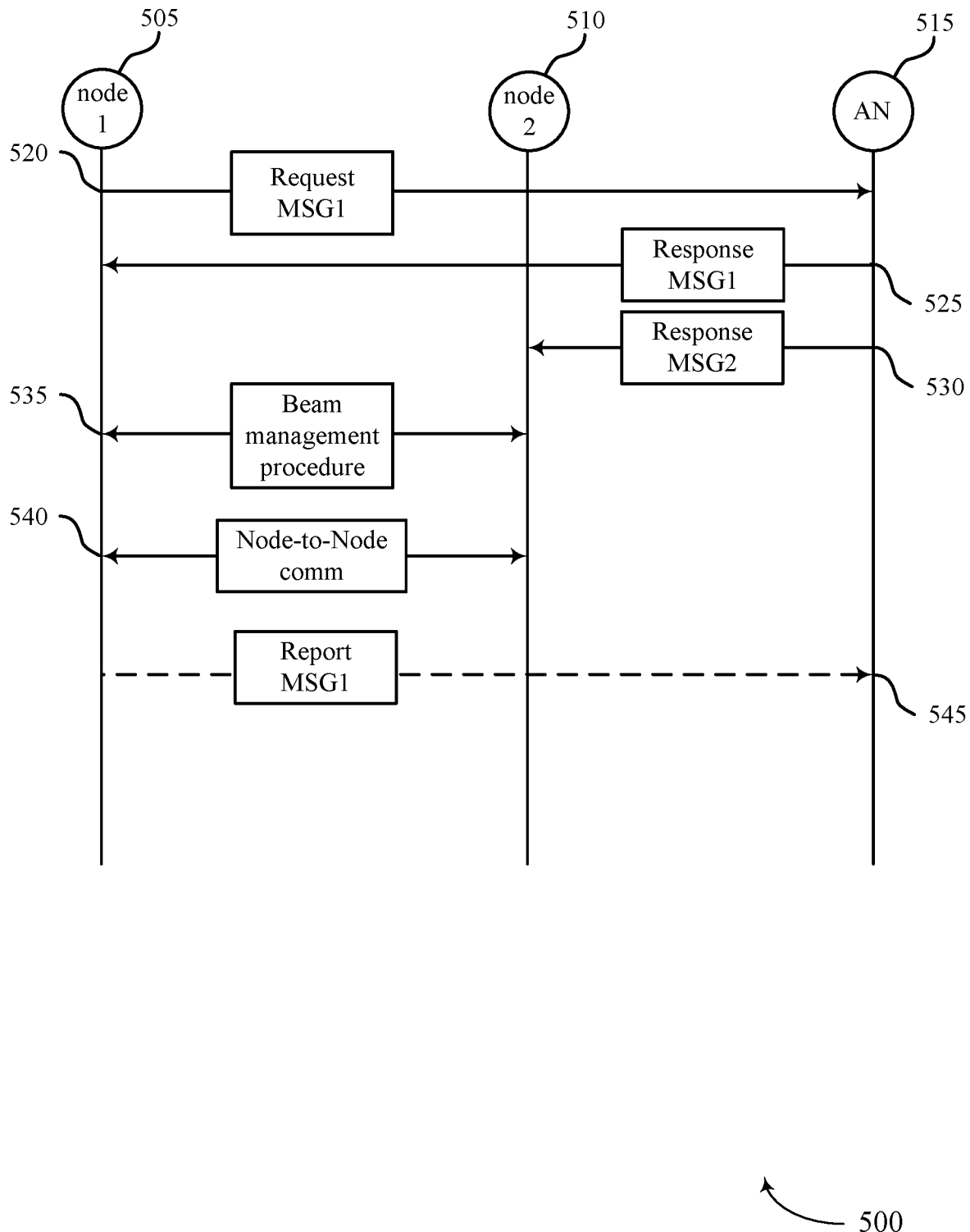

FIG. 5 illustrates an example of a process flow 500 in accordance with various aspects of the present disclosure. In some examples, process flow 500 may implement aspects of wireless communications system 100, 200, or 300. Process flow 500 may include a first node 505, a second node 510, and an access node 515. The first node 505, second node 510, and access node 515 each may be a base station 105 or a UE 115 such as described with reference to FIGS. 1-2.

In the example of FIG. 5, first node 505 may transmit a request message 520 to access node 515. Request message 520 may be a request for a node-to-node communication link between first node 505 and second node 510. Request message 520 may request, for example, a sidelink operation with second node 510. In other examples, the request message 520 may be a request for a backhaul link with second node 510. The communication link may, as discussed above, refer to a link for transmitting a single communication block (including data channel(s) and possibly control channel(s)) from a transmitting node to a receiving node, and possibly receiving one or more control channels (e.g., that provide feedback such as ACK/NACK indicating successful or unsuccessful reception of a transmission). In some cases, the communication link may be used for a communication session that includes a sequence of communication blocks that are transmitted/received between first node 505 and second node 510, in which cases, some aspects of beam management may be performed along with the communication.

Access node 515 may receive request message 520, and transmit a first response message 525 to first node 505 and a second response message 530 to second node 510. In some cases, each of first response message 525 and second response message 530 may provide a communication link management procedure configuration and a configuration for the communication link (e.g., time/frequency/power resources for communication, etc.).

First node 505 and second node 510 may receive the respective response messages 525-430, and perform beam management procedure 535. As discussed above, beam management procedure 535 may provide information used to establish a directional communication link, and may be performed and configured as discussed above with respect to FIG. 4.

As part of beam management procedure 535, first node 505 and second node 510 may select a transmission beam. First node 505 and second node 510 may then use allocated resources for node-to-node communications 540. In some cases, one or both of first node 505 and second node 510 may transmit a report message 545 to access node 515, which may indicate that the node-to-node communication operation is over (freeing up resources) request for more resources, provide beam or channel measurement reports, or any combination thereof.

Figure 6:
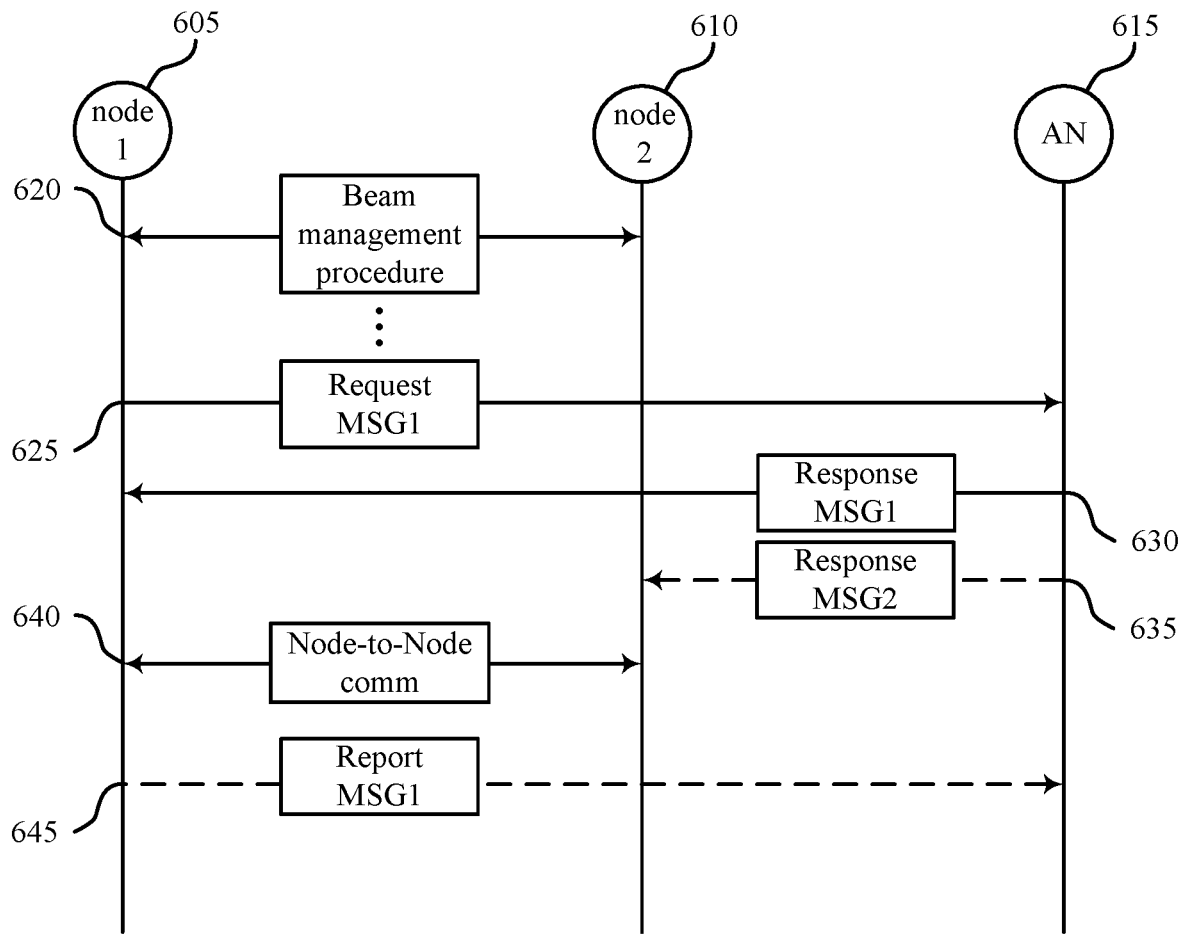

FIG. 6 illustrates an example of a process flow 600 in accordance with various aspects of the present disclosure. In some examples, process flow 600 may implement aspects of wireless communications system 100, 200, or 300. Process flow 600 may include a first node 605, a second node 610, and an access node 615. First node 605, second node 610, and access node 615 each may be examples of a base station 105 or a UE 115 such as described with reference to FIGS. 1-2.

In this example, first node 605 and second node 610 may perform a beam management procedure 620 prior to first node 605 transmitting a request message 625 to access node 615. As discussed above, beam management procedure 620 may provide information used to establish a directional communication link, and may be performed and configured as discussed above with respect to FIG. 4. In some cases, beam management procedure 620 may be performed in the background or prior to establishing a communication link (e.g., a sidelink communication). In some cases, beam management procedure 620 may be performed periodically, such as by using resources that are pre-allocated for the procedure. In some cases, beam management procedure 620 may be coordinated by access node 615 (or another node), and in other cases, there may be no coordination by access node 615. In other examples, first node 605 and second node 610 may perform beam management procedure 620 according to another schedule (e.g., as part of another cluster of nodes). In some cases, beam measurement reports may be sent directly over sidelink, and/or to access node 615. In some examples, beam management procedure 620 may be used to identify best candidate beam pairs (e.g., beam pairs that have a highest quality, a highest signal strength, are affected by the least amount of interference, etc.) with no or minimal coordination from access node 615. For example, first node 605 may initiate a beam or synchronization reference signal transmission, and may page second node 610 to measure the beam or synchronization reference signals (e.g., by sending one or multiple paging signals in one or more different directions), and a beam measurement report may be sent directly between first node 605 and second node 610. In some cases, beam measurements from a prior communication link between first node 605 and second node 610 may be used, and may remain valid for a period of time following the prior connection.

Request message 625 may be a request for a node-to-node communication link between first node 605 and second node 610. Request message 625 may request, for example, a sidelink operation with second node 610. In other examples, request message 625 may be a request for a backhaul link with second node 610. In some cases, request message 625 may include beam measurement information (e.g., sets of suitable beam pairs and associated quality), one or more candidate resources or configurations for the communication link, or combinations thereof.

Access node 615 may receive request message 625, and transmit a first response message 630 to first node 605 and, optionally, a second response message 635 to second node 610. In some cases, each of first response message 630 and second response message 635 may provide a configuration for the communication link (e.g., time/frequency/power resources for communications, etc.). In some cases, access node 615 may not send second response message 635 to second node 610, and instead first node 605 may transmit a control message within scheduled resources where second node 610 is scanning. Such a control message may contain a choice of transmit/receive beams.

First node 605 and second node 610 may then use allocated resources for node-to-node communications 640. In some cases, one or both of first node 605 and second node 610 may transmit a report message 645 to access node 615, which may indicate that the node-to-node communication operation is over (thereby freeing up resources), request for more resources, provide beam or channel measurement reports, or any combination thereof.

Figure 7:
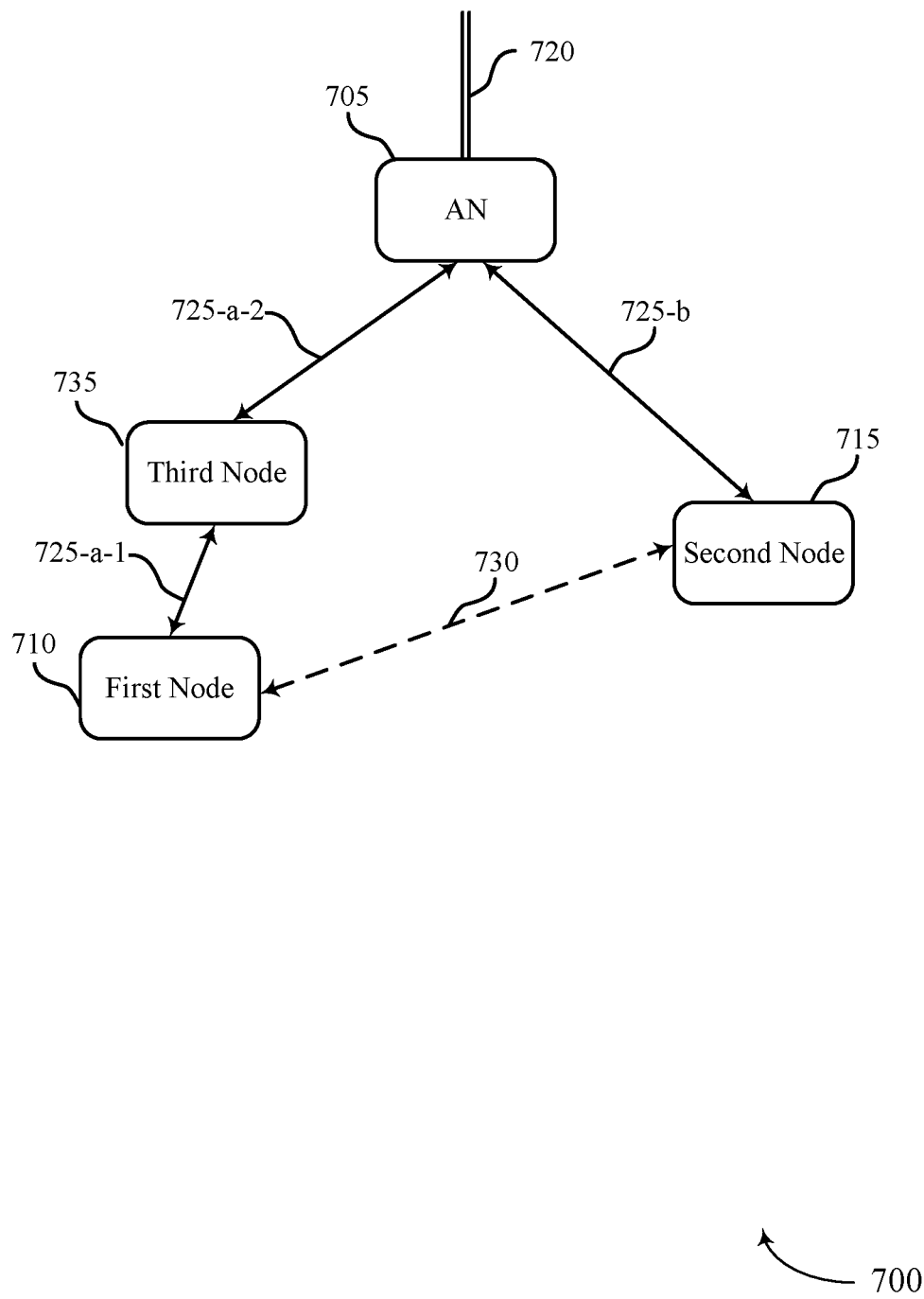
FIG. 7 illustrates an example of a multi-hop portion of a wireless communications system in accordance with aspects of the present disclosure.

FIG. 7 illustrates an example of a portion of a wireless communications system 700 in accordance with various aspects of the present disclosure. In some examples, wireless communication system 700 may implement aspects of wireless communications system 100 or 200. While the above examples describe connections between a node and an access node, various aspects of the disclosure may provide that such a connection is a logical connection that may span one or more intermediate nodes.

In the example of FIG. 7, an access node 705, which may be an example of a base station 105 or UE 115 as described with reference to FIGS. 1 and 2, may support one or more wireless links 725 between multiple other access nodes, which may include one or more multi-hop links. In this example, a first node 710 (e.g., a base station 105 or UE 115) may communicate with access node 705 over a multi-hop link. The multi-hop link may include a first wireless link 725-a-1 between first node 710 and a third node 735 (e.g., a base station 105 or UE 115), as well as a second wireless link 725-a-2 between third node 735 and access node 705. A second node 715 (e.g., a base station 105 or a UE 115) may communicate with access node 705 over wireless link 725-b. Access node 705 may have an access connection 720 to a core network, which, in some examples, may be a fiber backhaul connection. In some cases, access node 705 may configure a node-to-node connection 730 (e.g., a communication link) between first node 710 and second node 715. Such a configuration may be performed in accordance with techniques such as discussed with reference to the examples of FIGS. 4-6.

Figure 8:
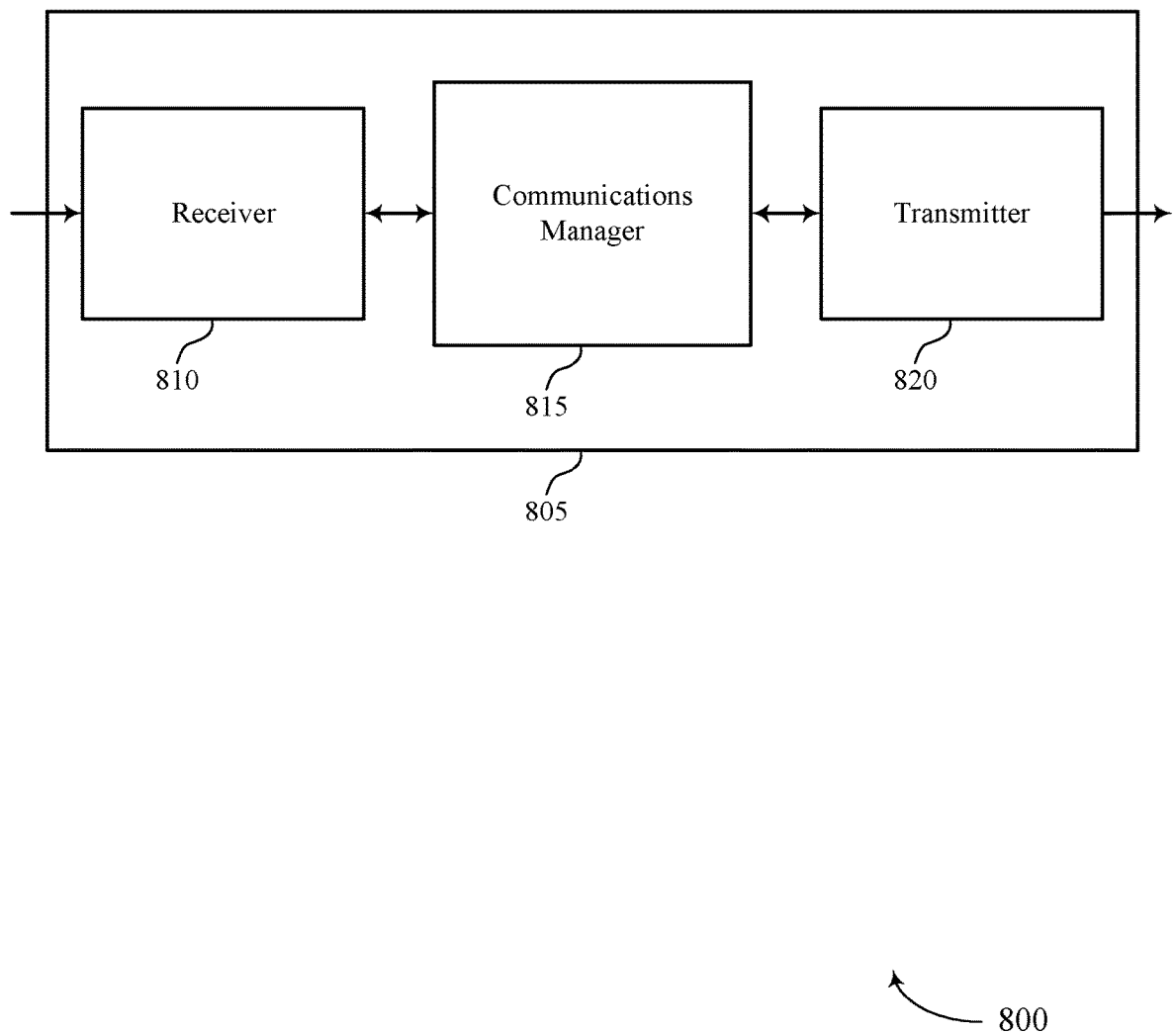
FIGS. 8 through 10 show block diagrams of a device in accordance with aspects of the present disclosure.

FIG. 8 shows a block diagram 800 of a wireless device 805 in accordance with aspects of the present disclosure. Wireless device 805 may be an example of aspects of a UE 115 or base station 105 as described herein. Wireless device 805 may include receiver 810, communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to assisted node-to-node communication link operations in a wireless network, etc.). Information may be passed on to other components of the device. The receiver 810 may be an example of aspects of the transceiver 1135 described with reference to FIG. 11. The receiver 810 may utilize a single antenna or a set of antennas.

Communications manager 815 may be an example of aspects of the communications manager 1115 described with reference to FIG. 11. Communications manager 815 and/or at least some of its various sub-components may be implemented in hardware, software executed by a processor, firmware, or any combination thereof. If implemented in software executed by a processor, the functions of the communications manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

Communications manager 815 and/or at least some of its various sub-components may be physically located at various positions, including being distributed such that portions of functions are implemented at different physical locations by one or more physical devices. In some examples, communications manager 815 and/or at least some of its various sub-components may be a separate and distinct component in accordance with various aspects of the present disclosure. In other examples, communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 815 may be a part of an access node, and may receive a request from a first node to establish a communication link with a second node, where the communication link is a directional communication link for transmission of one or more of control information or data between the first node and the second node, determine, at the access node, a configuration for the communication link between the first node and the second node, and transmit, to at least one of the first node or the second node, the configuration for the communication link. Communications manager 815, in other cases, may be part of a first node, and may identify a second node for establishing a communication link for directional transmission of one or more of control information or data, transmit, from the first node, a request to an access node to establish the communication link with a second node, receive, from the access node, a configuration for the communication link between the first node and the second node, and establish, at the first node, the communication link with the second node based on the configuration for the communication link.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
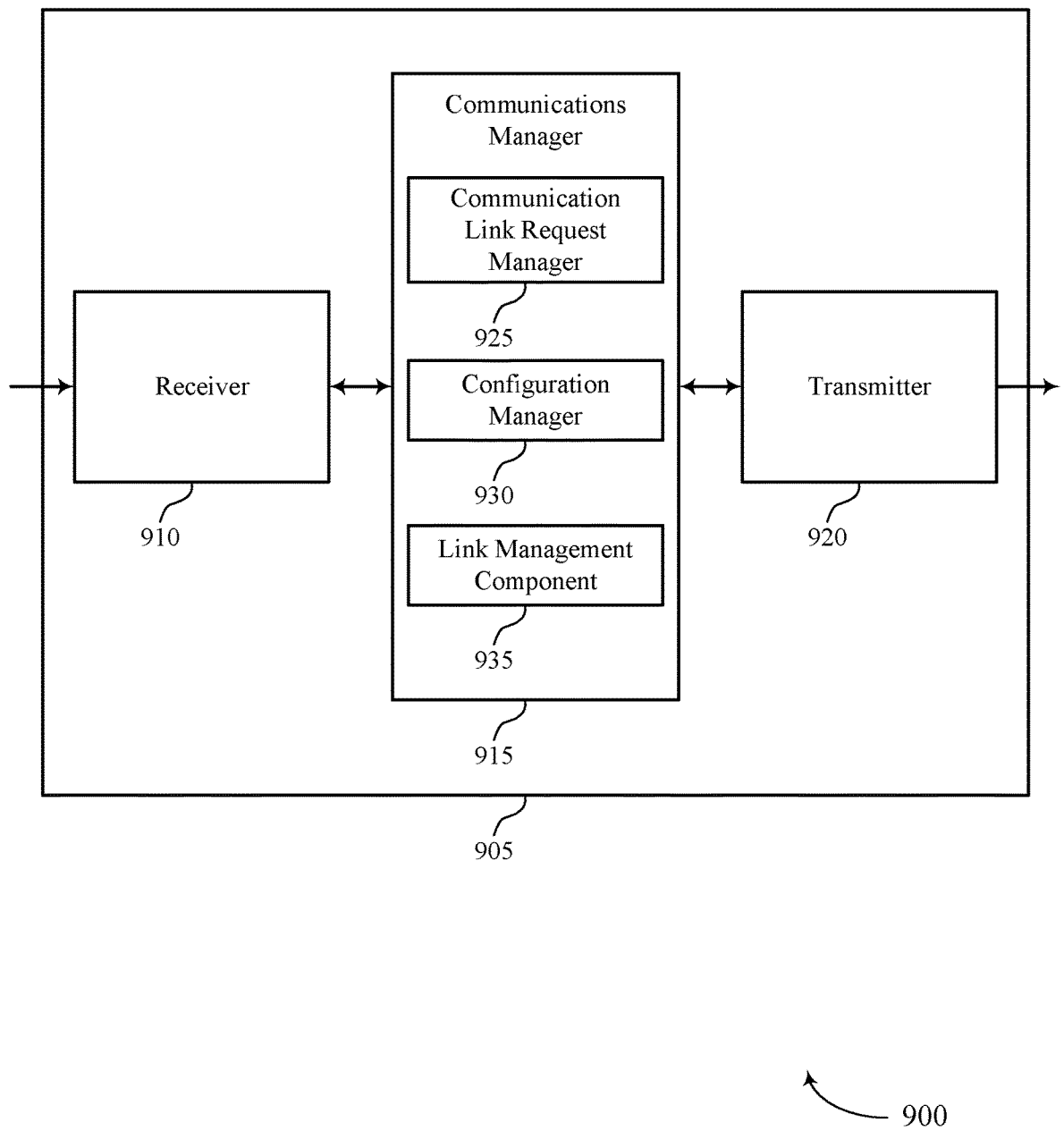

FIG. 9 shows a block diagram 900 of a wireless device 905 in accordance with aspects of the present disclosure. Wireless device 905 may be an example of aspects of a wireless device 805 or a UE 115 or base station 105 as described with reference to FIG. 8. Wireless device 905 may include receiver 910, communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to assisted node-to-node communication link operations in a wireless network, etc.). Information may be passed on to other components of the device. The receiver 910 may be an example of aspects of the transceiver 1135 described with reference to FIG. 11. The receiver 910 may utilize a single antenna or a set of antennas.

Communications manager 915 may be an example of aspects of the communications manager 1115 described with reference to FIG. 11. Communications manager 915 may also include communication link request manager 925, configuration manager 930, and link management component 935.

Communication link request manager 925 may, in cases where it is part of an access node, receive a request from a first node to establish a communication link with a second node, where the communication link is a directional communication link for transmission of one or more of control information or data between the first node and the second node. In cases where communication link request manager 925 is part of the first node, it may identify a second node for establishing a communication link for directional transmission of one or more of control information or data, and transmit, from the first node, a request to an access node to establish the communication link with a second node.

In some cases, the request to establish the communication link includes one or more of communication link measurement information for a potential communication link between the first node and the second node, or candidate resources for the potential communication link between the first node and the second node. In some cases, the communication link measurement information or the candidate resources are based on a prior communication link between the first node and the second node. In some cases, the request to establish the communication link includes one or more of communication link measurement information for a potential communication link between the first node and the second node, or candidate resources for the potential communication link between the first node and the second node. In some cases, the communication link measurement information or the candidate resources are based on a prior communication link between the first node and the second node.

Configuration manager 930, when part of an access node, may determine a configuration for the communication link between the first node and the second node, and transmit, to at least one of the first node or the second node, the configuration for the communication link. In cases where configuration manager 930 is part of the first node, it may receive, from the access node, a configuration for the communication link between the first node and the second node. In some cases, configuration manager 930 may receive a configuration from the access node to perform a communication link management procedure prior to transmitting the request to establish the communication link.

In some cases, the configuration for the communication link includes one or more of a transmission/measurement time window, periodicity, or transmission bandwidth, a set of transmit and receive directional beams to be measured at the first node and the second node, a reference signal configuration including one or more of a reference signal sequence, or a number of antenna ports for reference signal transmission, QCL information between different antenna ports of the first node or the second node, or a numerology for the communication link. In some cases, the configuration is for a sidelink communication between the first node and the second node and includes one or more of time or frequency resources for transmitting one or more of control of data between the first node and the second node, an identification of transmit and receive beams for the sidelink communication, a MCS for the sidelink communication, a number of antenna ports for the sidelink communication, a number of layers for the sidelink communication, a numerology for the sidelink communication, or a transmission power for the sidelink communication.

In some cases, the access node may determine a configuration based on one or more of one or more measurement reports from the first node, the second node, or one or more neighboring nodes, capabilities of the first node or the second node, traffic present at one or more of the first node, the second node, or one or more other nodes, a preferred set of resources or configurations of the first node or the second node, or a state or schedule of one or more neighboring nodes to the first node or the second node. In some cases, the determining further includes determining a communication link management procedure configuration that includes one or more of a configuration for transmitting and receiving reference signals using a set of directional transmission beams, a configuration for transmitting and receiving one or more of synchronization signals, paging signals, or a random access preamble using the set of directional transmission beams, or a resource and beam configuration correspondence between different reference signals and synchronization signals. In some cases, the access node provides one or more of a schedule or a set of pre-allocated resources for performing the communication link management procedure.

Link management component 935 may, when part of an access node, determine a communication link management procedure configuration, receive, from one or more of the first node or the second node, one or more measurement characteristics from the communication link management procedure, and where the communication link configuration is based on the one or more measurement characteristics. In some cases, link management component 935 may receive, from one or more of the first node or the second node subsequent to communications using the communication link, a report associated with the communication link. In some cases, link management component 935 may configure, prior to receiving the request to establish the communication link, one or more of the first node or the second node to perform a communication link management procedure prior to transmitting the request to establish the communication link. In some cases, the communication link management procedure configuration may be provided to one or more of the first node or the second node.

Link management component 935 may, when part of the first node, may establish the communication link with the second node based on the configuration for the communication link received from the access node. In some cases, one or more measurements from the communication link management procedure may be transmitted to the access node prior to receiving the configuration for the communication link. In some cases, link management component 935 may transmit, to the access node, subsequent to communications using the communication link, a report associated with the communication link. In some instances, the report includes one or more of an indication that communication between the first node and the second node is complete, a request for additional communication link resources, or a measurement report with one or more measurement characteristics of the communication link. In some cases, the report includes one or more of an indication that communication between the first node and the second node is complete, a request for additional communication link resources, or a measurement report with one or more measurement characteristics of the communication link. In some cases, the receiving further includes receiving, from the access node, a communication link management procedure configuration, and performing the communication link management procedure. In some instances, the access node provides one or more of a schedule or a set of pre-allocated resources to one or more of the first node or the second node for performing the communication link management procedure.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
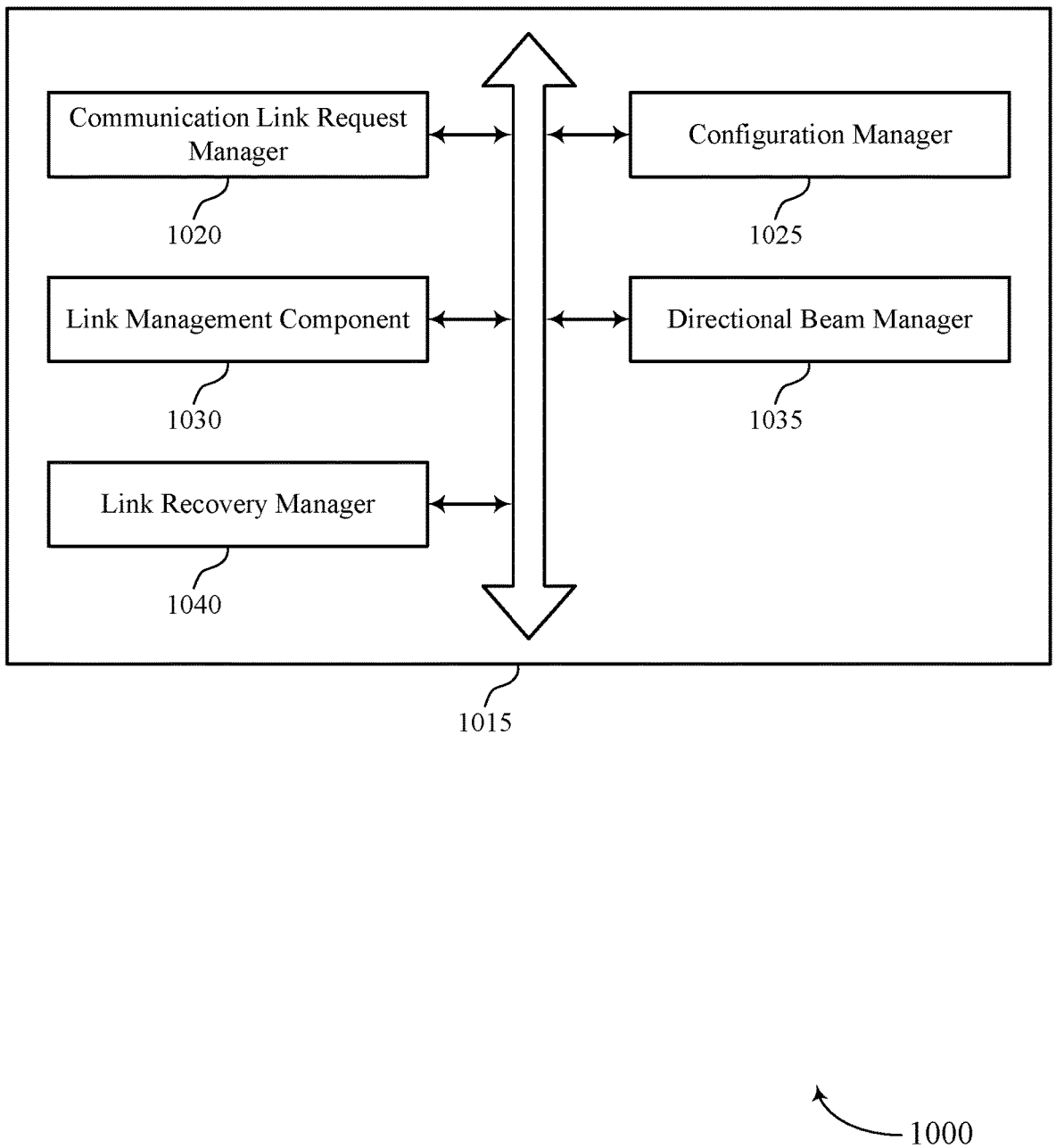

FIG. 10 shows a block diagram 1000 of a communications manager 1015 in accordance with aspects of the present disclosure. The communications manager 1015 may be an example of aspects of a communications manager 815, a communications manager 915, or a communications manager 1115 described with reference to FIGS. 8, 9, and 11. The communications manager 1015 may include communication link request manager 1020, configuration manager 1025, link management component 1030, directional beam manager 1035, and link recovery manager 1040. Each of these modules may communicate, directly or indirectly, with one another (e.g., via one or more buses).

Communication link request manager 1020 may, in cases where it is part of an access node, receive a request from a first node to establish a communication link with a second node, where the communication link is a directional communication link for transmission of one or more of control information or data between the first node and the second node. In cases where communication link request manager 1020 is part of the first node, it may identify a second node for establishing a communication link for directional transmission of one or more of control information or data, and transmit, from the first node, a request to an access node to establish the communication link with a second node.

In some cases, the request to establish the communication link includes one or more of communication link measurement information for a potential communication link between the first node and the second node, or candidate resources for the potential communication link between the first node and the second node. In some cases, the communication link measurement information or the candidate resources are based on a prior communication link between the first node and the second node. In some examples, the request to establish the communication link includes one or more of communication link measurement information for a potential communication link between the first node and the second node, or candidate resources for the potential communication link between the first node and the second node. In some instances, the communication link measurement information or the candidate resources are based on a prior communication link between the first node and the second node.

Configuration manager 1025, when part of an access node, may determine a configuration for the communication link between the first node and the second node, and transmit, to at least one of the first node or the second node, the configuration for the communication link. In cases where configuration manager 1025 is part of the first node, it may receive, from the access node, a configuration for the communication link between the first node and the second node. In some instances, configuration manager 1025 may receive a configuration from the access node to perform a communication link management procedure prior to transmitting the request to establish the communication link.

In some examples, the configuration for the communication link includes one or more of: a transmission/measurement time window, periodicity, or transmission bandwidth; a set of transmit and receive directional beams to be measured at the first node and the second node; a reference signal configuration including one or more of a reference signal sequence or a number of antenna ports for reference signal transmission; QCL information between different antenna ports of the first node or the second node; or a numerology for the communication link. In some cases, the configuration is for a sidelink communication between the first node and the second node and includes one or more of time or frequency resources for transmitting one or more of control of data between the first node and the second node, an identification of transmit and receive beams for the sidelink communication, an MCS for the sidelink communication, a number of antenna ports for the sidelink communication, a number of layers for the sidelink communication, a numerology for the sidelink communication, or a transmission power for the sidelink communication.

In some cases, the access node may determine a configuration based on one or more of one or more measurement reports from the first node, the second node, or one or more neighboring nodes, capabilities of the first node or the second node, traffic present at one or more of the first node, the second node, or one or more other nodes, a preferred set of resources or configurations of the first node or the second node, or a state or schedule of one or more neighboring nodes to the first node or the second node. In some cases, the determining further includes determining a communication link management procedure configuration that includes one or more of a configuration for transmitting and receiving reference signals using a set of directional transmission beams, a configuration for transmitting and receiving one or more of synchronization signals, paging signals, or a random access preamble using the set of directional transmission beams, or a resource and beam configuration correspondence between different reference signals and synchronization signals. In some instances, the access node provides one or more of a schedule or a set of pre-allocated resources for performing the communication link management procedure.

Link management component 1030 may, when part of an access node, determine a communication link management procedure configuration, receive, from one or more of the first node or the second node, one or more measurement characteristics from the communication link management procedure, and where the communication link configuration is based on the one or more measurement characteristics. In some cases, link management component 1030 may receive, from one or more of the first node or the second node subsequent to communications using the communication link, a report associated with the communication link. In some examples, link management component 1030 may configure, prior to receiving the request to establish the communication link, one or more of the first node or the second node to perform a communication link management procedure prior to transmitting the request to establish the communication link. In some cases, the communication link management procedure configuration may be provided to one or more of the first node or the second node.

Link management component 1030 may, when part of the first node, may establish the communication link with the second node based on the configuration for the communication link received from the access node. In some cases, one or more measurements from the communication link management procedure may be transmitted to the access node prior to receiving the configuration for the communication link. In some instances, link management component 1030 may transmit, to the access node, subsequent to communications using the communication link, a report associated with the communication link. In some cases, the report includes one or more of an indication that communication between the first node and the second node is complete, a request for additional communication link resources, or a measurement report with one or more measurement characteristics of the communication link. In some examples, the report includes one or more of an indication that communication between the first node and the second node is complete, a request for additional communication link resources, or a measurement report with one or more measurement characteristics of the communication link. In some cases, the receiving further includes receiving, from the access node, a communication link management procedure configuration, and performing the communication link management procedure. In some instances, the access node provides one or more of a schedule or a set of pre-allocated resources to one or more of the first node or the second node for performing the communication link management procedure.

Directional beam manager 1035, in some cases, may determine one or more directional transmission beam characteristics for a directional transmission beam between the first node and the second node, and the configuration is based on the one or more directional transmission beam characteristics. In some instances, the one or more directional transmission beam characteristics include one or more of time or frequency resources for the communication link, one or more transmit or receive beams for the communication link, an MCS for the communication link, a number of antenna ports for the communication link, a number of layers for the communication link, a numerology for the communication link, a transmission power for the communication link, or any combination thereof. In some cases, the communication link is a directional transmission beam, and where the receiving includes receiving one or more directional transmission beam characteristics for the directional transmission beam between the first node and the second node.

Link recovery manager 1040 may manage link recovery in the event of a link failure. In some cases, the determining further includes determining a communication link failure recovery mechanism and resources for reporting a communication link failure to the access node or the other of the first node or the second node.

Figure 11:
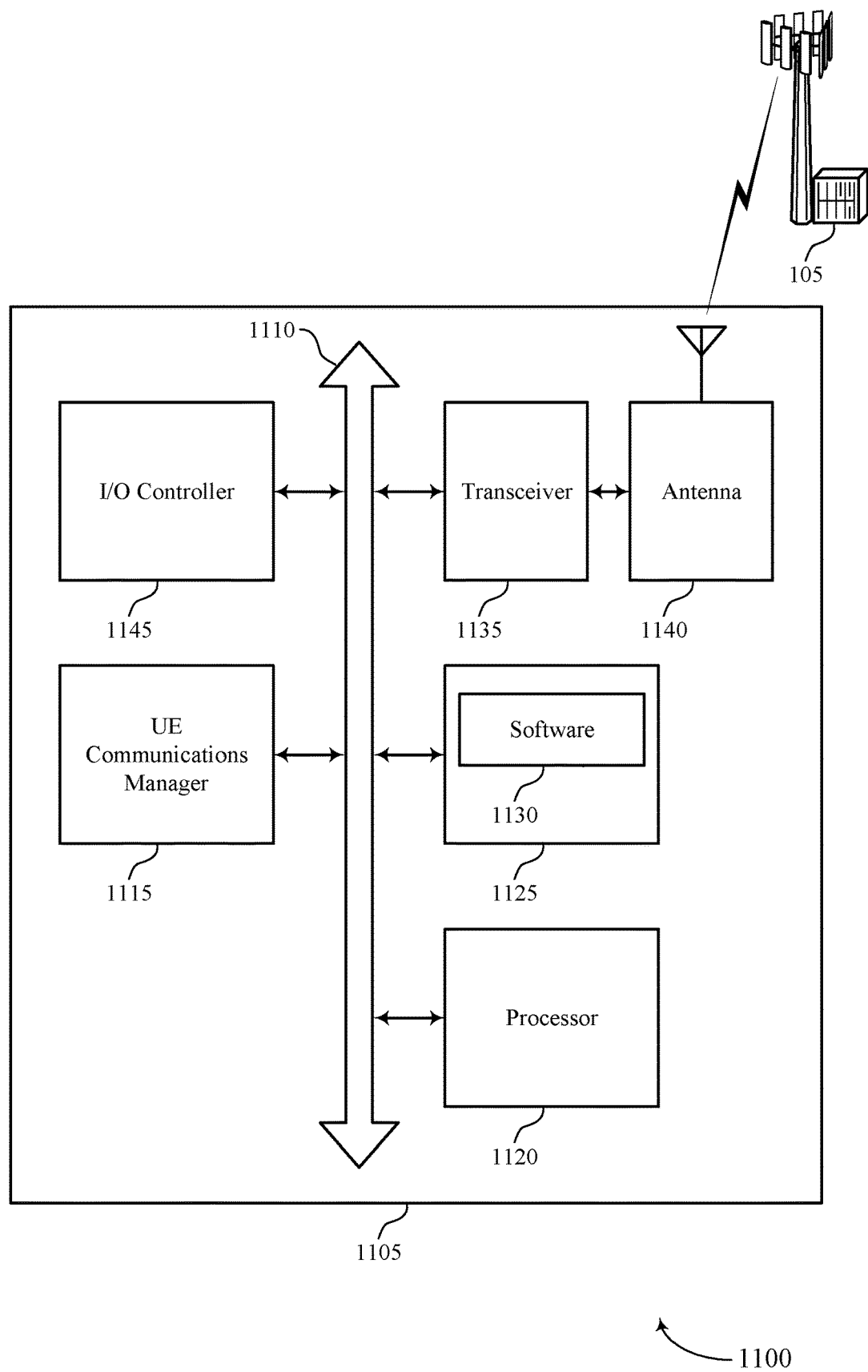
FIG. 11 illustrates a block diagram of a system including a user equipment (UE) in accordance with aspects of the present disclosure.

FIG. 11 shows a diagram of a system 1100 including a device 1105 in accordance with aspects of the present disclosure. Device 1105 may be an example of or include the components of wireless device 805, wireless device 905, or a UE 115 as described above, e.g., with reference to FIGS. 8 and 9. Device 1105 may include components for bi-directional voice and data communications including components for transmitting and receiving communications, including communications manager 1115, processor 1120, memory 1125, software 1130, transceiver 1135, antenna 1140, and I/O controller 1145. These components may be in electronic communication via one or more buses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other examples, a memory controller may be integrated into processor 1120. Processor 1120 may be configured to execute computer-readable instructions stored in a memory to perform various functions (e.g., functions or tasks supporting assisted node-to-node communication link operations in a wireless network).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support assisted node-to-node communication link operations in a wireless network. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas. In some cases, the device 1105 may include a single antenna 1140. However, in some instances the device 1105 may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some instances, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some examples, I/O controller 1145 may be implemented as part of a processor. In some cases, a user may interact with device 1105 via I/O controller 1145 or via hardware components controlled by I/O controller 1145.

Figure 12:
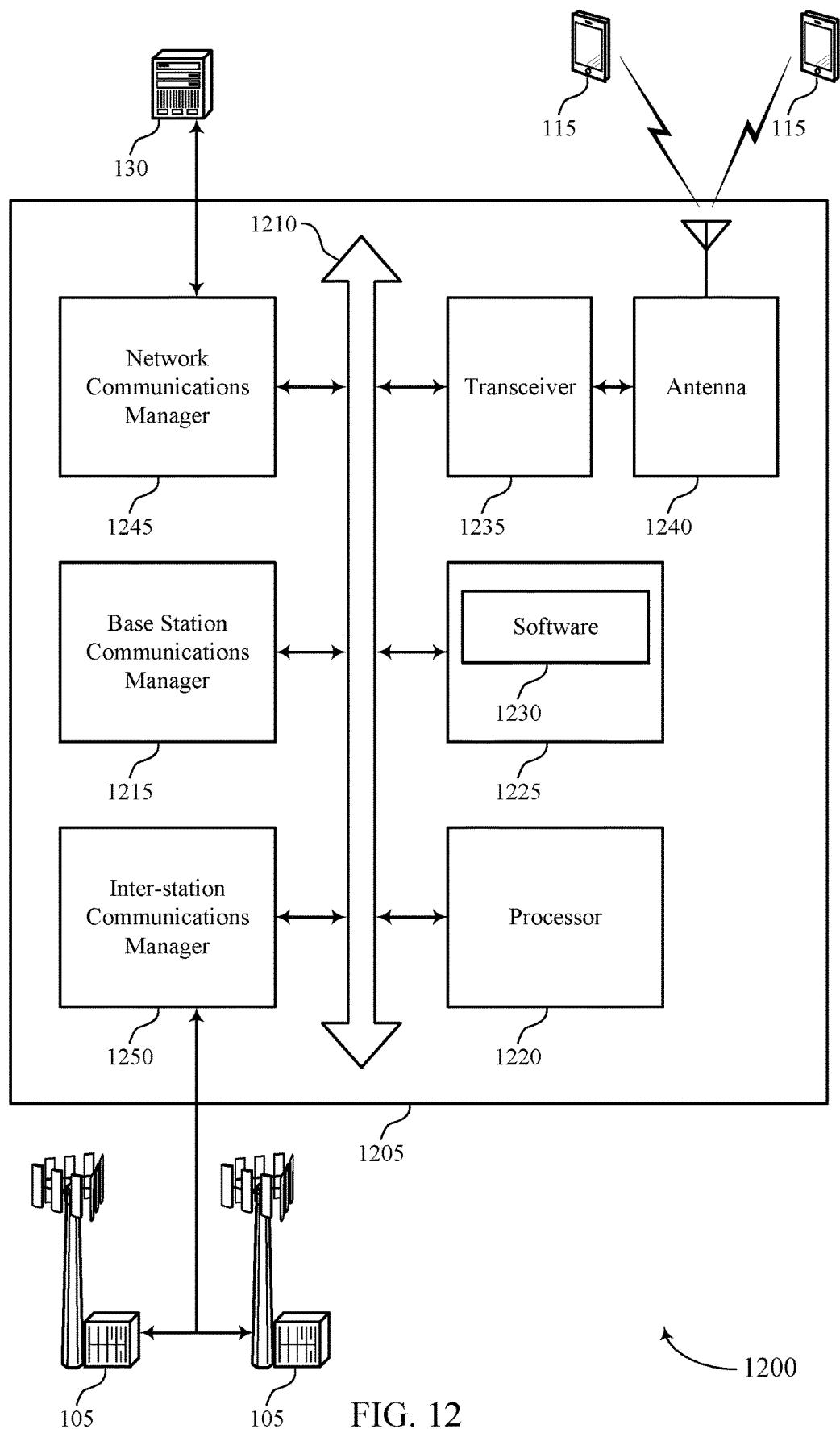
FIG. 12 illustrates a block diagram of a system including a base station in accordance with aspects of the present disclosure.

FIG. 12 shows a diagram of a system 1200 including a device 1205 in accordance with aspects of the present disclosure. Device 1205 may be an example of or include the components of wireless device 905, wireless device 1005, or a base station 105 as described above, e.g., with reference to FIGS. 9 and 10. Device 1205 may include components for bi-directional voice and data communications including components for transmitting and receiving communications, including communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting assisted node-to-node communication link operations in a wireless network).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support assisted node-to-node communication link operations in a wireless network. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas. In some cases, the device 1205 may include a single antenna 1240. However, in some cases the device 1205 may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an LTE/LTE-A wireless communication network technology to provide communication between base stations 105.

Figure 13:
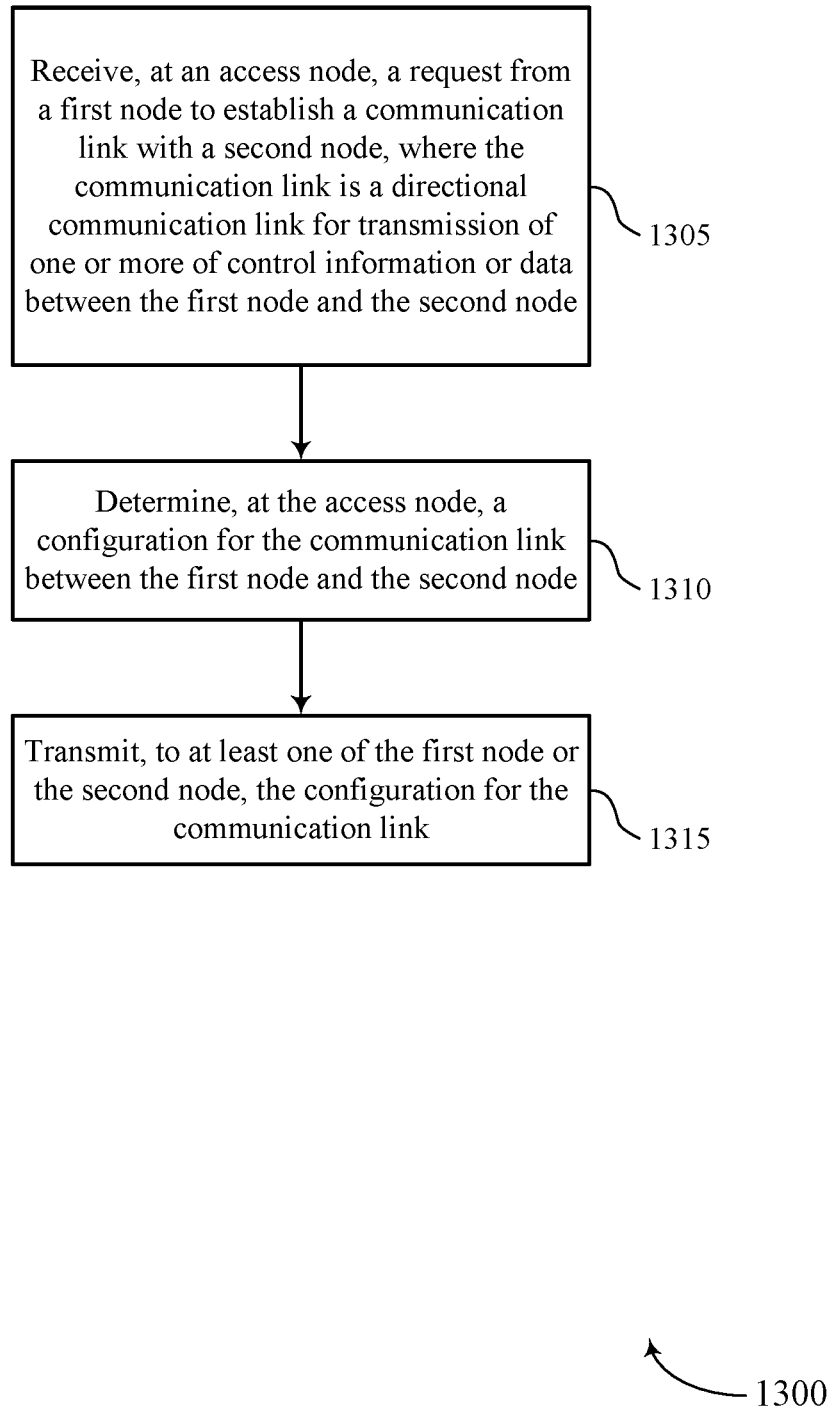
FIGS. 13 through 15 illustrate methods in accordance with aspects of the present disclosure.

FIG. 13 shows a flowchart illustrating a method 1300 in accordance with aspects of the present disclosure. The operations of method 1300 may be implemented by a UE 115 or base station 105 or its components as described herein. For example, the operations of method 1300 may be performed by a communications manager as described with reference to FIGS. 8 through 10. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1305 the UE 115 or base station 105 may receive, as an access node, a request from a first node to establish a communication link with a second node, where the communication link is a directional communication link for transmission of one or more of control information or data between the first node and the second node. The operations of 1305 may be performed according to the methods described herein. In certain examples, aspects of the operations of 1305 may be performed by a communication link request manager as described with reference to FIGS. 8 through 10.

At 1310 the UE 115 or base station 105 may determine, as the access node, a configuration for the communication link between the first node and the second node. The operations of 1310 may be performed according to the methods described herein. In certain examples, aspects of the operations of 1310 may be performed by a configuration manager as described with reference to FIGS. 8 through 10.

At 1315 the UE 115 or base station 105 may transmit, to at least one of the first node or the second node, the configuration for the communication link. The operations of 1315 may be performed according to the methods described herein. In certain examples, aspects of the operations of 1315 may be performed by a configuration manager as described with reference to FIGS. 8 through 10.

Figure 14:
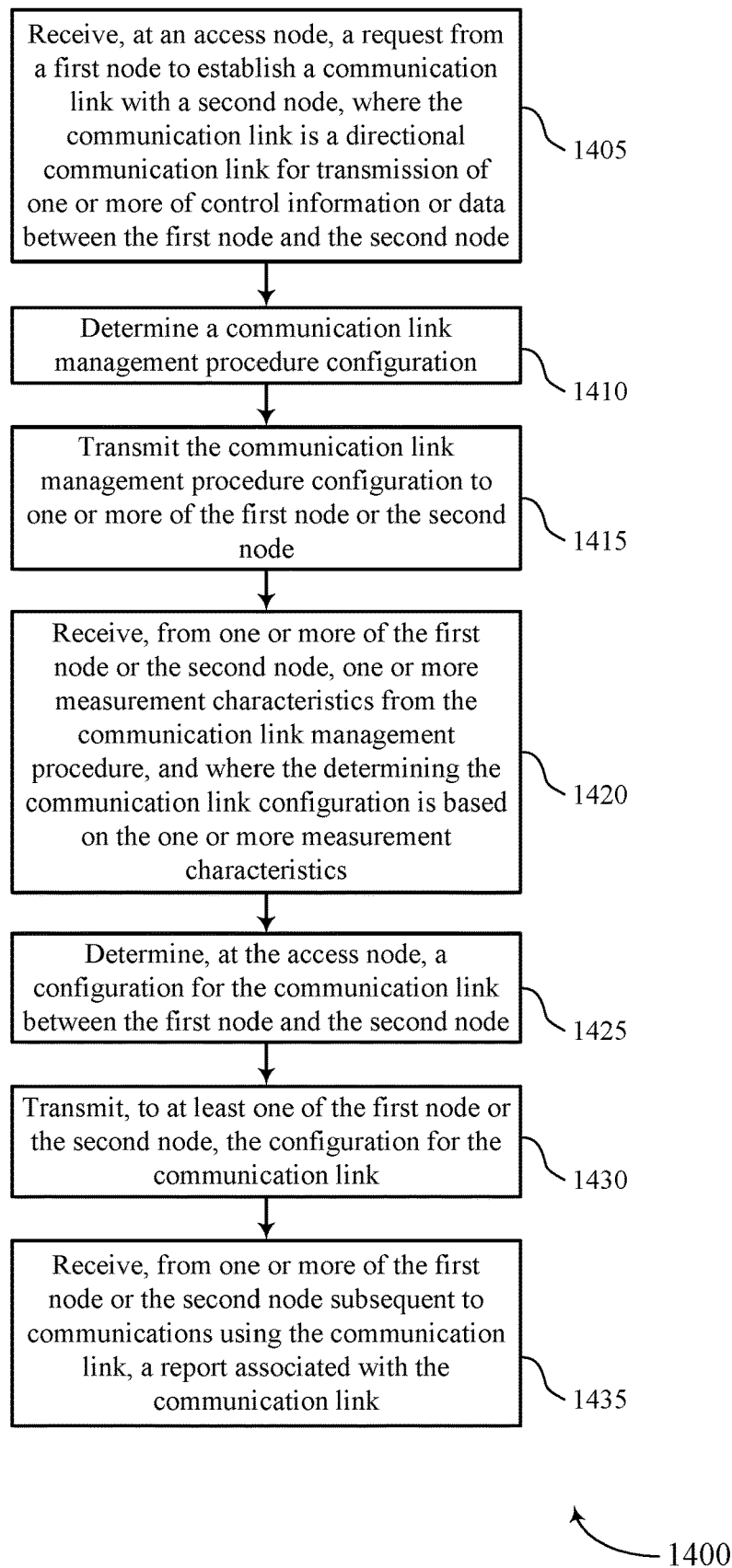

FIG. 14 shows a flowchart illustrating a method 1400 in accordance with aspects of the present disclosure. The operations of method 1400 may be implemented by a UE 115 or base station 105 or its components as described herein. For example, the operations of method 1400 may be performed by a communications manager as described with reference to FIGS. 8 through 10. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1405 the UE 115 or base station 105 may receive, as an access node, a request from a first node to establish a communication link with a second node, where the communication link is a directional communication link for transmission of one or more of control information or data between the first node and the second node. The operations of 1405 may be performed according to the methods described herein. In certain examples, aspects of the operations of 1405 may be performed by a communication link request manager as described with reference to FIGS. 8 through 10.

At 1410 the UE 115 or base station 105 may determine a communication link management procedure configuration. The operations of 1410 may be performed according to the methods described herein. In certain examples, aspects of the operations of 1410 may be performed by a link management component as described with reference to FIGS. 8 through 10.

At 1415 the UE 115 or base station 105 may transmit the communication link management procedure configuration to one or more of the first node or the second node. The operations of 1415 may be performed according to the methods described herein. In certain examples, aspects of the operations of 1415 may be performed by a link management component as described with reference to FIGS. 8 through 10.

At 1420 the UE 115 or base station 105 may receive, from one or more of the first node or the second node, one or more measurement characteristics from the communication link management procedure, and where the determining the communication link configuration is based on the one or more measurement characteristics. The operations of 1420 may be performed according to the methods described herein. In certain examples, aspects of the operations of 1420 may be performed by a link management component as described with reference to FIGS. 8 through 10.

At 1425 the UE 115 or base station 105 may determine a configuration for the communication link between the first node and the second node. The operations of 1425 may be performed according to the methods described herein. In certain examples, aspects of the operations of 1425 may be performed by a configuration manager as described with reference to FIGS. 8 through 10.

At 1430 the UE 115 or base station 105 may transmit, to at least one of the first node or the second node, the configuration for the communication link. The operations of 1430 may be performed according to the methods described herein. In certain examples, aspects of the operations of 1430 may be performed by a configuration manager as described with reference to FIGS. 8 through 10.

At 1435 the UE 115 or base station 105 may receive, from one or more of the first node or the second node subsequent to communications using the communication link, a report associated with the communication link. The operations of 1435 may be performed according to the methods described herein. In certain examples, aspects of the operations of 1435 may be performed by a link management component as described with reference to FIGS. 8 through 10.

Figure 15:
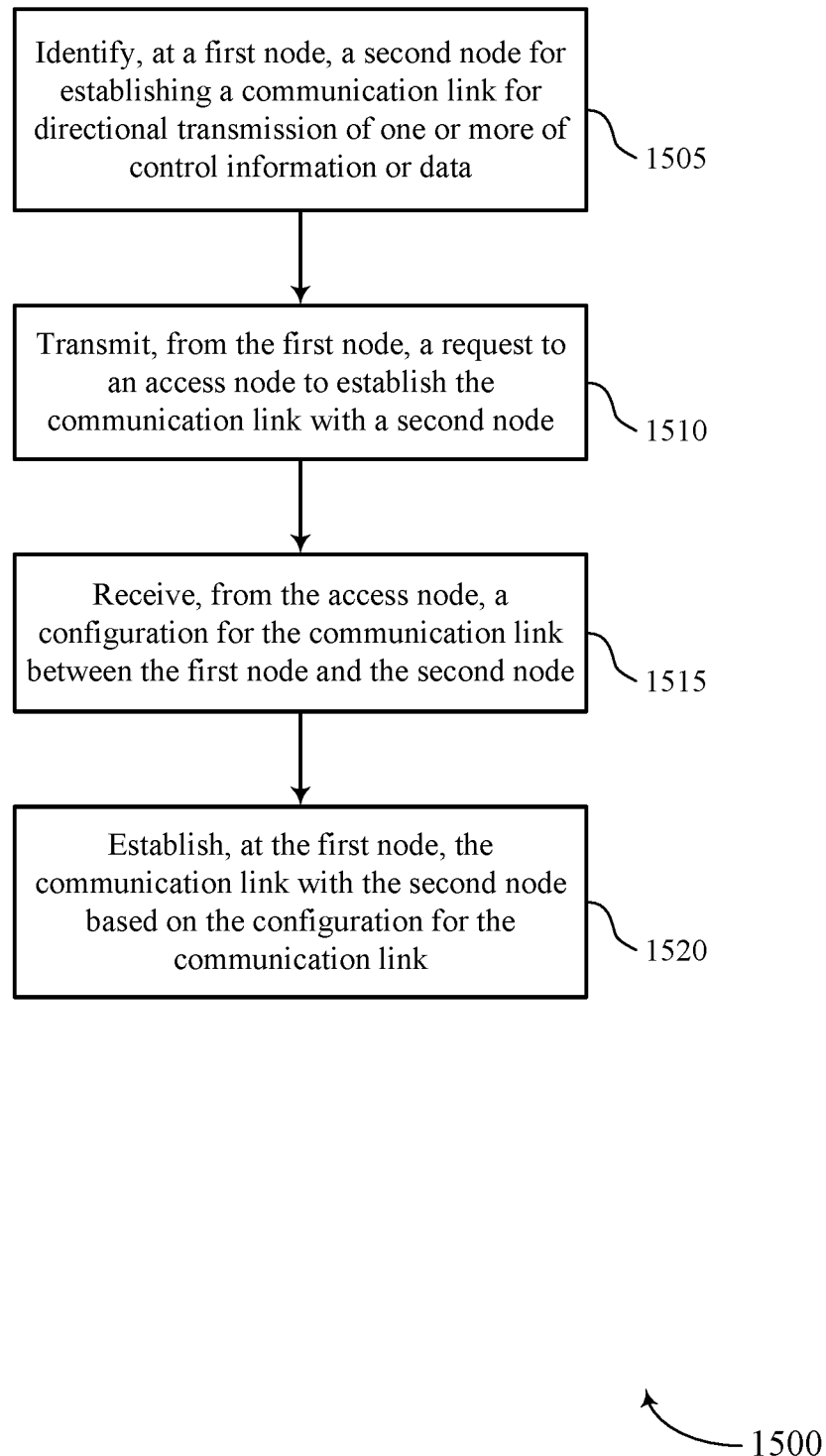

FIG. 15 shows a flowchart illustrating a method 1500 in accordance with aspects of the present disclosure. The operations of method 1500 may be implemented by a UE 115 or base station 105 or its components as described herein. For example, the operations of method 1500 may be performed by a communications manager as described with reference to FIGS. 8 through 10. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1505 the UE 115 or base station 105 may identify, as a first node, a second node for establishing a communication link for directional transmission of one or more of control information or data. The operations of 1505 may be performed according to the methods described herein. In certain examples, aspects of the operations of 1505 may be performed by a communication link request manager as described with reference to FIGS. 8 through 10.

At 1510 the UE 115 or base station 105 may transmit, from the first node, a request to an access node to establish the communication link with a second node. The operations of 1510 may be performed according to the methods described herein. In certain examples, aspects of the operations of 1510 may be performed by a communication link request manager as described with reference to FIGS. 8 through 10.

At 1515 the UE 115 or base station 105 may receive, from the access node, a configuration for the communication link between the first node and the second node. The operations of 1515 may be performed according to the methods described herein. In certain examples, aspects of the operations of 1515 may be performed by a configuration manager as described with reference to FIGS. 8 through 10.

At 1520 the UE 115 or base station 105 may establish, at the first node, the communication link with the second node based on the configuration for the communication link. The operations of 1520 may be performed according to the methods described herein. In certain examples, aspects of the operations of 1520 may be performed by a link management component as described with reference to FIGS. 8 through 10.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-orthogonal frequency division multiplexing (OFDM), etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, at a base station with a wired backhaul link, a request comprising an indication of a communication link between a first node and a second node and requesting to establish the communication link, wherein the communication link is a directional communication link for transmission of one or more of control information or data between the first node and the second node;
   determining, at the base station, a configuration for the communication link between the first node and the second node; and
   transmitting, to at least one of the first node or the second node, the configuration for the communication link.

2. The method of claim 1, wherein the determining comprises:
   determining one or more directional transmission beam characteristics for a directional transmission beam between the first node and the second node, and wherein the configuration is based at least in part on the one or more directional transmission beam characteristics.

3. The method of claim 2, wherein the one or more directional transmission beam characteristics comprise one or more of:
   time or frequency resources for the communication link;
   one or more transmit or receive beams for the communication link;
   a modulation and coding scheme (MCS) for the communication link;
   a number of antenna ports for the communication link;
   a number of layers for the communication link;
   a numerology for the communication link;
   a transmission power for the communication link;
   or any combination thereof.

4. The method of claim 1, further comprising:
   determining a communication link management procedure configuration; and
   transmitting the communication link management procedure configuration to one or more of the first node or the second node.

5. The method of claim 4, further comprising:
   receiving, from one or more of the first node or the second node, one or more measurement characteristics from a communication link management procedure based at least in part on the communication link management procedure configuration, wherein the determining the configuration for the communication link is based at least in part on the one or more measurement characteristics.

6. The method of claim 1, further comprising:
   receiving, from one or more of the first node or the second node subsequent to communications using the communication link, a report associated with the communication link.

7. The method of claim 6, wherein:
   the report includes one or more of an indication that communication between the first node and the second node is complete, a request for additional communication link resources, or a measurement report with one or more measurement characteristics of the communication link.

8. The method of claim 1, wherein:
   the request to establish the communication link includes one or more of communication link measurement information for a potential communication link between the first node and the second node, or candidate resources for the potential communication link between the first node and the second node.

9. The method of claim 8, wherein the communication link measurement information or the candidate resources are based on a prior communication link between the first node and the second node.

10. The method of claim 1, further comprising:
    configuring, prior to receiving the request to establish the communication link, one or more of the first node or the second node to perform a communication link management procedure prior to transmitting the request to establish the communication link.

11. The method of claim 10, wherein:
the base station provides one or more of a schedule or a set of pre-allocated resources to one or more of the first node or the second node for performing the communication link management procedure.

12. The method of claim 1, wherein the configuration for the communication link includes one or more of:
a transmission/measurement time window, periodicity, or transmission bandwidth,
a set of transmit and receive directional beams to be measured at the first node and the second node,
a reference signal configuration including one or more of a reference signal sequence, or a number of antenna ports for reference signal transmission,
quasi-colocation (QCL) information between different antenna ports of the first node or the second node,
a numerology for the communication link, or
a transmission power for the communication link.

13. The method of claim 1, wherein the configuration is for a sidelink communication between the first node and the second node and includes one or more of:
time or frequency resources for transmitting one or more of control of data between the first node and the second node,
an identification of transmit and receive beams for the sidelink communication,
a modulation and coding scheme (MCS) for the sidelink communication,
a number of antenna ports for the sidelink communication,
a number of layers for the sidelink communication,
a numerology for the sidelink communication, or
a transmission power for the sidelink communication.

14. The method of claim 1, wherein the determining is based at least in part on one or more of:
one or more measurement reports from the first node, the second node, or one or more neighboring nodes,
capabilities of the first node or the second node,
traffic present at one or more of the first node, the second node, or one or more other nodes,
a preferred set of resources or configurations of the first node or the second node, or
a state or schedule of the one or more neighboring nodes to the first node or the second node.

15. The method of claim 1, wherein the determining further comprises:
determining a communication link management procedure configuration that includes one or more of a configuration for transmitting and receiving reference signals using a set of directional transmission beams, a configuration for transmitting and receiving one or more of synchronization signals, paging signals, or a random access preamble using the set of directional transmission beams, or a resource and beam configuration correspondence between different reference signals and synchronization signals.

16. The method of claim 1, wherein the determining further comprises determining a communication link failure recovery mechanism and resources for reporting a communication link failure to the base station or the other of the first node or the second node.

17. A method for wireless communication, comprising:
identifying, at a first node, a second node for establishing a communication link for directional transmission of one or more of control information or data;
transmitting, from the first node to a base station, a request comprising an indication of the communication link between the first node and the second node and requesting to establish the communication link with the second node;
receiving, from the base station, a configuration for the communication link between the first node and the second node; and
establishing, at the first node, the communication link with the second node based at least in part on the configuration for the communication link.

18. The method of claim 17, wherein the communication link is a directional transmission beam, and wherein the receiving comprises receiving one or more directional transmission beam characteristics for the directional transmission beam between the first node and the second node.

19. The method of claim 18, wherein the one or more directional transmission beam characteristics comprise one or more of:
time or frequency resources for the communication link,
one or more transmit or receive beams for the communication link,
a modulation and coding scheme (MCS) for the communication link,
a number of antenna ports for the communication link,
a number of layers for the communication link,
a numerology for the communication link,
a transmission power for the communication link, or
any combination thereof.

20. The method of claim 17, wherein the receiving further comprises:
receiving, from the base station with a wired backhaul link, a communication link management procedure configuration; and
performing a communication link management procedure based at least in part on the communication link management procedure configuration, wherein the configuration for the communication link is based at least in part on one or more measurements made during the communication link management procedure.

21. The method of claim 20, further comprising:
transmitting one or more measurements from the communication link management procedure to the base station prior to receiving the configuration for the communication link.

22. The method of claim 17, further comprising:
transmitting, to the base station, subsequent to communications using the communication link, a report associated with the communication link.

23. The method of claim 22, wherein the report includes one or more of an indication that communication between the first node and the second node is complete, a request for additional communication link resources, or a measurement report with one or more measurement characteristics of the communication link.

24. The method of claim 17, wherein the request to establish the communication link includes one or more of communication link measurement information for a potential communication link between the first node and the second node, or candidate resources for the potential communication link between the first node and the second node.

25. The method of claim 24, wherein the communication link measurement information or the candidate resources are based on a prior communication link between the first node and the second node.

26. The method of claim 17, further comprising:
receiving, at the first node, a configuration from the base station to perform a communication link management procedure prior to transmitting the request to establish the communication link.

27. The method of claim 26, wherein:
the base station provides one or more of a schedule or a set of pre-allocated resources for performing the communication link management procedure.

28. An apparatus for wireless communication, comprising:
a processor;
memory in electronic communication with the processor; and
instructions stored in the memory and operable, when executed by the processor, to cause the apparatus to:
receive, at base station with a wired backhaul link, a request comprising an indication of a communication link between a first node and a second node and requesting to establish the communication link, wherein the communication link is a directional communication link for transmission of one or more of control information or data between the first node and the second node;
determine, at the base station, a configuration for the communication link between the first node and the second node; and
transmit, to at least one of the first node or the second node, the configuration for the communication link.

29. The apparatus of claim 28, wherein the instructions to determine the configuration are executable by the processor to cause the apparatus to:
determine one or more directional transmission beam characteristics for a directional transmission beam between the first node and the second node, and wherein the configuration is based at least in part on the one or more directional transmission beam characteristics.

30. An apparatus for wireless communication, comprising:
a processor;
memory in electronic communication with the processor; and
instructions stored in the memory and operable, when executed by the processor, to cause the apparatus to:
identify, at a first node, a second node for establishing a communication link for directional transmission of one or more of control information or data;
transmit, from the first node to a base station with a wired backhaul link, a request comprising an indication of the communication link between the first node and the second node and requesting to establish the communication link with the second node;
receive, from the base station, a configuration for the communication link between the first node and the second node; and
establish, at the first node, the communication link with the second node based at least in part on the configuration for the communication link.

* * * * *